(12) United States Patent
Kikugawa

(10) Patent No.: US 7,853,141 B2
(45) Date of Patent: Dec. 14, 2010

(54) CAMERA CRADLE APPARATUS AND SYSTEM THEREFOR

(75) Inventor: Noriyuki Kikugawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1169 days.

(21) Appl. No.: 11/461,832

(22) Filed: Aug. 2, 2006

(65) Prior Publication Data

US 2007/0040894 A1 Feb. 22, 2007

(30) Foreign Application Priority Data

Aug. 3, 2005 (JP) ............................. 2005-225552

(51) Int. Cl.
*G03B 7/26* (2006.01)
*G03B 17/48* (2006.01)

(52) U.S. Cl. ........................ 396/301; 396/429

(58) Field of Classification Search ............ 396/56, 396/301, 429; 348/211.99, 21.11–211.4
See application file for complete search history.

(56) References Cited

U.S. PATENT DOCUMENTS

| 2002/0093583 A1* | 7/2002 | Ito | 348/373 |
| 2003/0048356 A1* | 3/2003 | Kohno et al. | 348/143 |
| 2004/0239772 A1* | 12/2004 | Onishi et al. | 348/211.2 |
| 2007/0025712 A1* | 2/2007 | Jezierski et al. | 396/56 |

FOREIGN PATENT DOCUMENTS

| JP | 09271019 A | 10/1997 |
| JP | 2002209175 A | 7/2002 |
| JP | 2002-218300 | 8/2002 |
| JP | 2003069882 A | 3/2003 |
| JP | 2003075907 A | 3/2003 |
| JP | 2005109709 A | 4/2005 |
| JP | 2005150887 A | 6/2005 |
| JP | 2005197967 A | 7/2005 |

* cited by examiner

*Primary Examiner*—W. B. Perkey
*Assistant Examiner*—Minh Q Phan
(74) *Attorney, Agent, or Firm*—Cowan, Liebowitz & Latman, P.C.

(57) ABSTRACT

A camera cradle apparatus includes an extension connector which connects a camera including a power supply button, a connector which connects an external terminal through a network so as to allow communication, and a control unit which controls a connection state of the connector. At least one of the external terminal and the camera cradle apparatus includes an external power supply button which performs on-off operation of the power supply of the camera. The control unit controls the connection state of the connector in accordance with whether the power supply of the camera is turned on by either the power supply button or the external power supply button.

11 Claims, 22 Drawing Sheets

CAMERA CRADLE APPARATUS AND SYSTEM THEREFOR

BACKGROUND OF THE INVENTION

1. Field of the Invention

The present invention relates to a camera cradle apparatus which can be connected to a camera and an external terminal, and a system for the apparatus.

2. Description of the Related Art

Recently, a camera cradle apparatus has been devised to facilitate connection between a camera and devices such as a personal computer, printer, charger, and AC adapter. This camera cradle apparatus is designed such that the above devices are connected to the apparatus through cables, and the camera can be connected to the devices by simply being mounted on the apparatus.

There has been provided a method of equipping a camera cradle apparatus with a storage function and reading out images from a camera. There has also been provided a method like a surveillance camera method of equipping a camera cradle apparatus with a pan/tilt function and capturing images from a camera under control through a network.

In addition, a method is disclosed in which when a digital camera is mounted on a cradle, the operation mode of the camera is automatically changed to the USB mode (see Japanese Patent Application Laid-Open No. 2002-218300 (paragraph number 0068, FIG. 1)).

According to Japanese Patent Application Laid-Open No. 2002-218300, however, only a power supply switch, a cradle connector, and the like are mounted on the cradle side, but there is provided no control means for setting the operation mode of a digital camera. For this reason, such a control means needs to be provided on the digital camera side, resulting in an increase in the manufacturing cost of the digital camera.

According to Japanese Patent Application Laid-Open No. 2002-218300, when the digital camera is mounted on the cradle or the power supply of the camera is turned on by turning on the power supply switch on the cradle side, a communication terminal is automatically connected to perform USB communication with the personal computer. However, since connection through a network such as the Internet is controlled on the personal computer side, the cradle can be connected to the network even if the cradle is not intended to be connected to the network.

SUMMARY OF THE INVENTION

The present invention has been made in consideration of the above problems, and has as its object to properly control the connection state between a camera cradle apparatus and an external terminal connected thereto in accordance with the type of power supply button.

A first aspect of the present invention is associated with a camera cradle apparatus, and is characterized by comprising a first connector which connects a camera including a power supply button, a second connector which connects an external terminal through a network so as to allow communication, and a control unit which controls a connection state of the second connector. The aspect is characterized in that at least one of the external terminal and the camera cradle apparatus includes an external power supply button which performs on-off operation of a power supply of the camera. The aspect is characterized in that the control unit controls a connection state of the second connector in accordance with whether the power supply of the camera is turned on by either the power supply button or the external power supply button.

A second aspect of the present invention is associated with a camera cradle system, and is characterized by comprising the camera cradle apparatus and a camera connected to the first connector.

A third aspect of the present invention is associated with a connection control method for a camera cradle apparatus, and is characterized by comprising steps of connecting a camera to a camera cradle apparatus, connecting an external terminal to the camera cradle apparatus through a network so as to allow communication, and controlling a connection state between the external terminal and the camera cradle apparatus in accordance with whether the power supply of the camera is turned on by either of power supply buttons of the camera, the camera cradle apparatus, and the external terminal.

Further features of the present invention will be become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

The preferred embodiments of the present invention will be described below with reference to the accompanying drawings.

First Embodiment

Figure 3A:
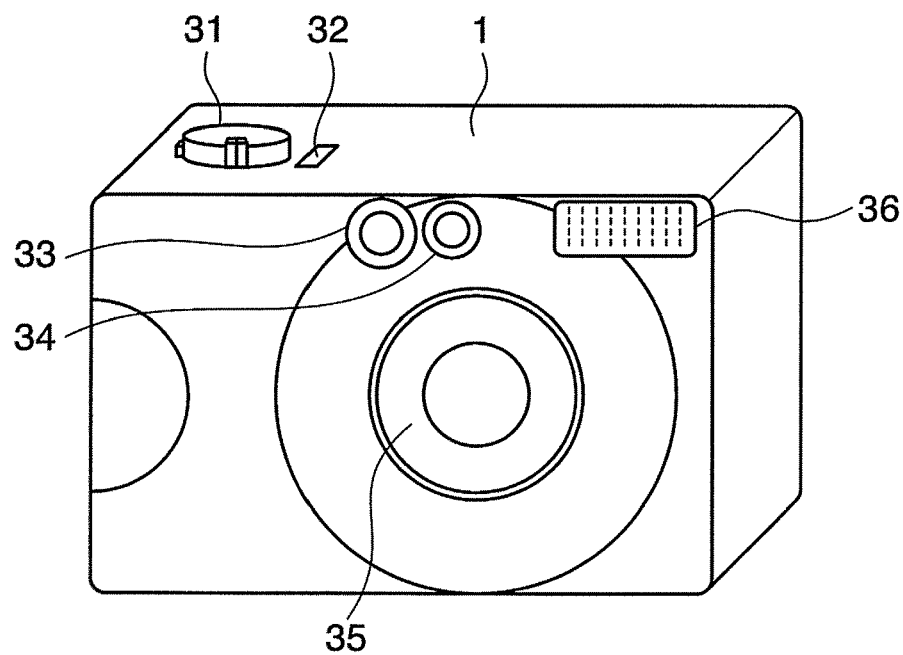
FIGS. 3A and 3B are schematic views of a camera according to a preferred embodiment of the present invention.
Figure 3B:
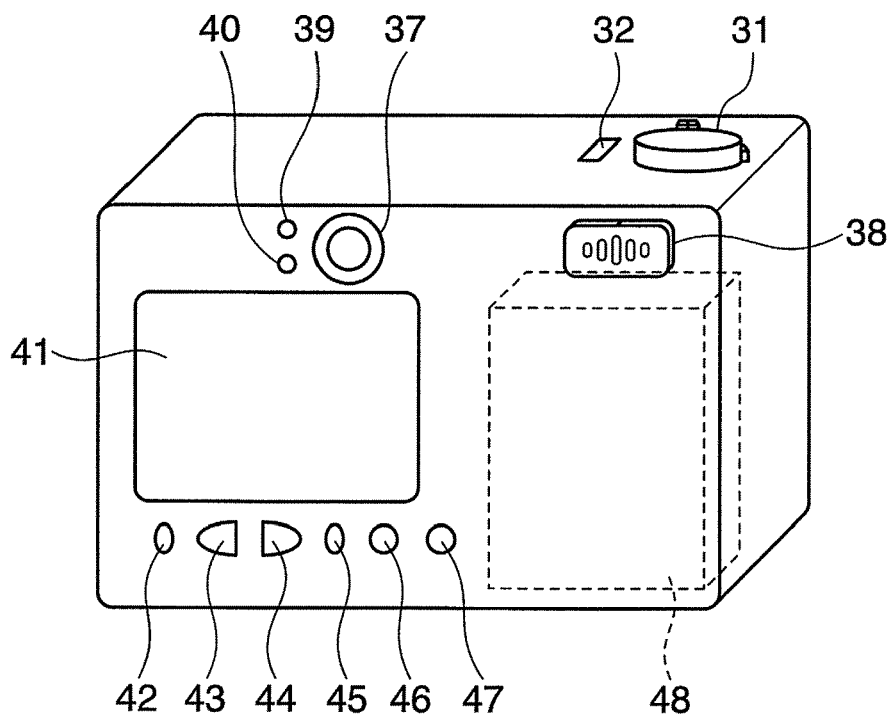

FIGS. 3A and 3B are perspective views showing the arrangement of a digital camera (to be referred to as a "DSC" hereinafter) 1 according to a predetermined embodiment of the present invention. FIG. 3A shows an outer appearance of the DSC 1 from the front surface side. FIG. 3B shows an outer appearance of the DSC 1 from the rear surface side. The DSC 1 comprises, for example, a shutter 31, power supply button 32, viewfinder window 33, distance measuring unit 34, retractable lens 35, electronic flash 36, viewfinder eyepiece unit 37, and the like. In this case, the power supply button is a toggle switch, of the power supply buttons designed to turn on/off the power supply of the camera, which is mounted on the DSC 1. The DSC 1 also comprises a mode switch 38. The mode switch 38 is designed to switch various kinds of operation modes including a photography mode, playback mode, and transfer mode. The DSC 1 also comprises LED lamps 39 and 40, liquid crystal display device 41, operation buttons 42 to 47, and battery 48. The LED lamps 39 and 40 indicate the status of the DSC 1 and an alarm. The liquid crystal display device 41 displays images and statuses in the respective modes. The battery 48 is the main power supply of the DSC 1. The operation button 47 functions as a direct button for giving an instruction to perform direct printing or direct transfer. The operation buttons 43 and 44 function as image selection buttons for image selection in the playback mode and the transfer mode.

Figure 2:
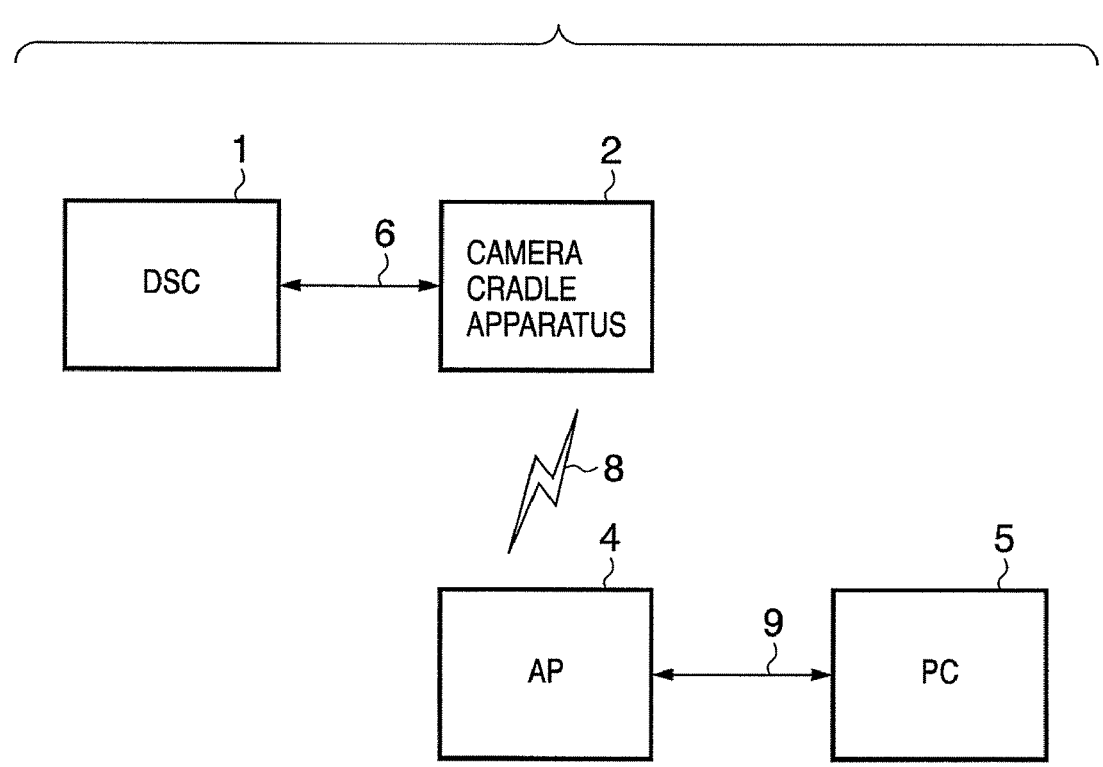
FIG. 2 is a block diagram showing the overall arrangement of a camera cradle system according to the first preferred embodiment of the present invention.

FIG. 2 is a block diagram showing the arrangement of a system comprising a DSC and a camera cradle apparatus. A camera cradle apparatus 2 is configured to allow the DSC 1 to be mounted thereon. The DSC 1 and the camera cradle apparatus 2 are connected to each other through signal lines that transmit signals 6 such as power supply control signals to the USB interface and the DSC 1, a power supply state discrimination signal for the DSC 1, and mount state discrimination signal for the DSC 1 to the camera cradle apparatus 2. An access point (to be referred to as an "AP" hereinafter) 4 is connected to the camera cradle apparatus 2 through signals in a wireless LAN 8 as a wireless connection means. A personal computer (to be referred to as a "PC" hereinafter) 5 as an external terminal is connected to the AP 4 through a wired LAN 9.

Figure 4:
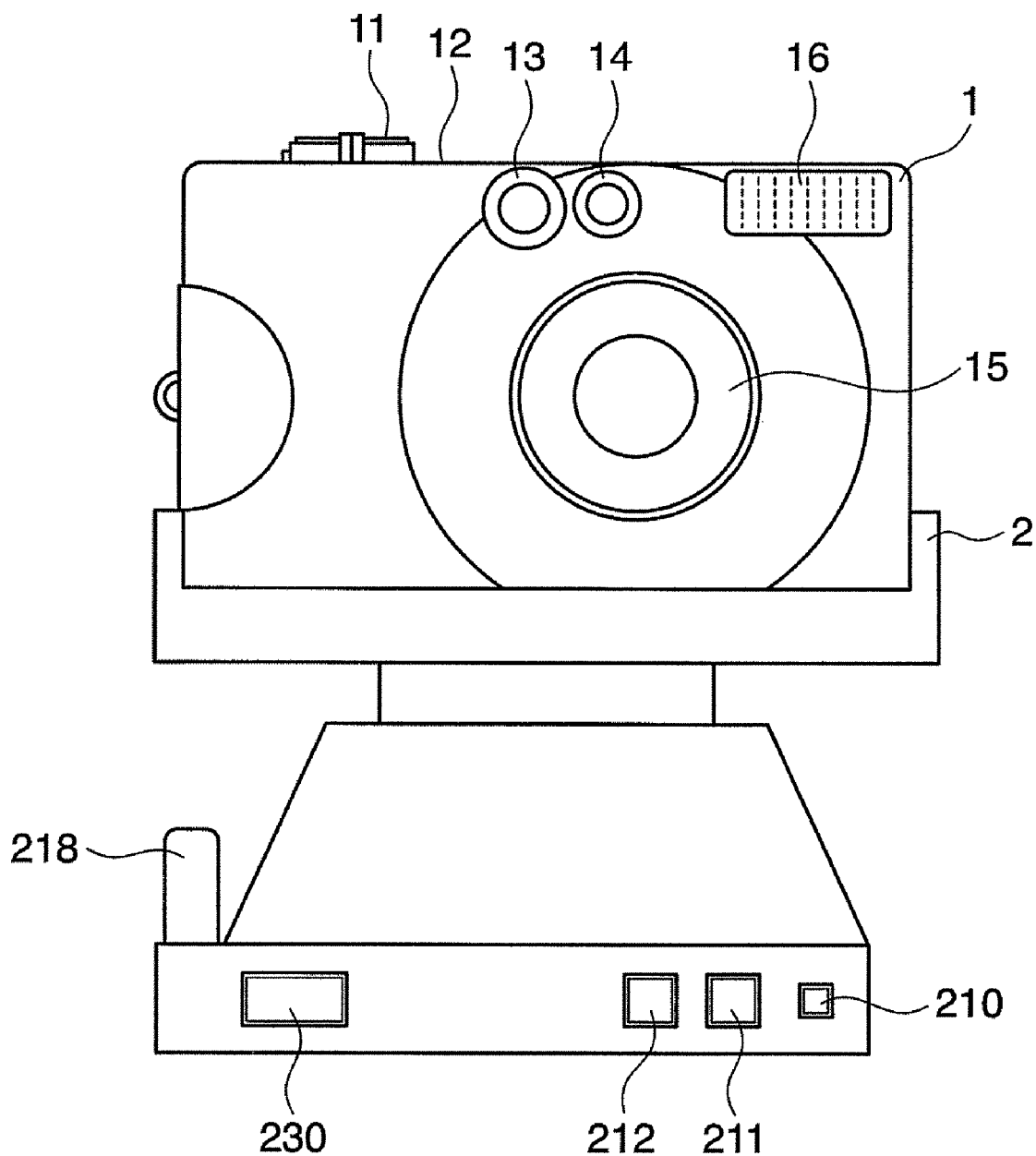
FIG. 4 is a schematic view of a camera and camera cradle apparatus according to the preferred embodiment of the present invention.
Figure 5:
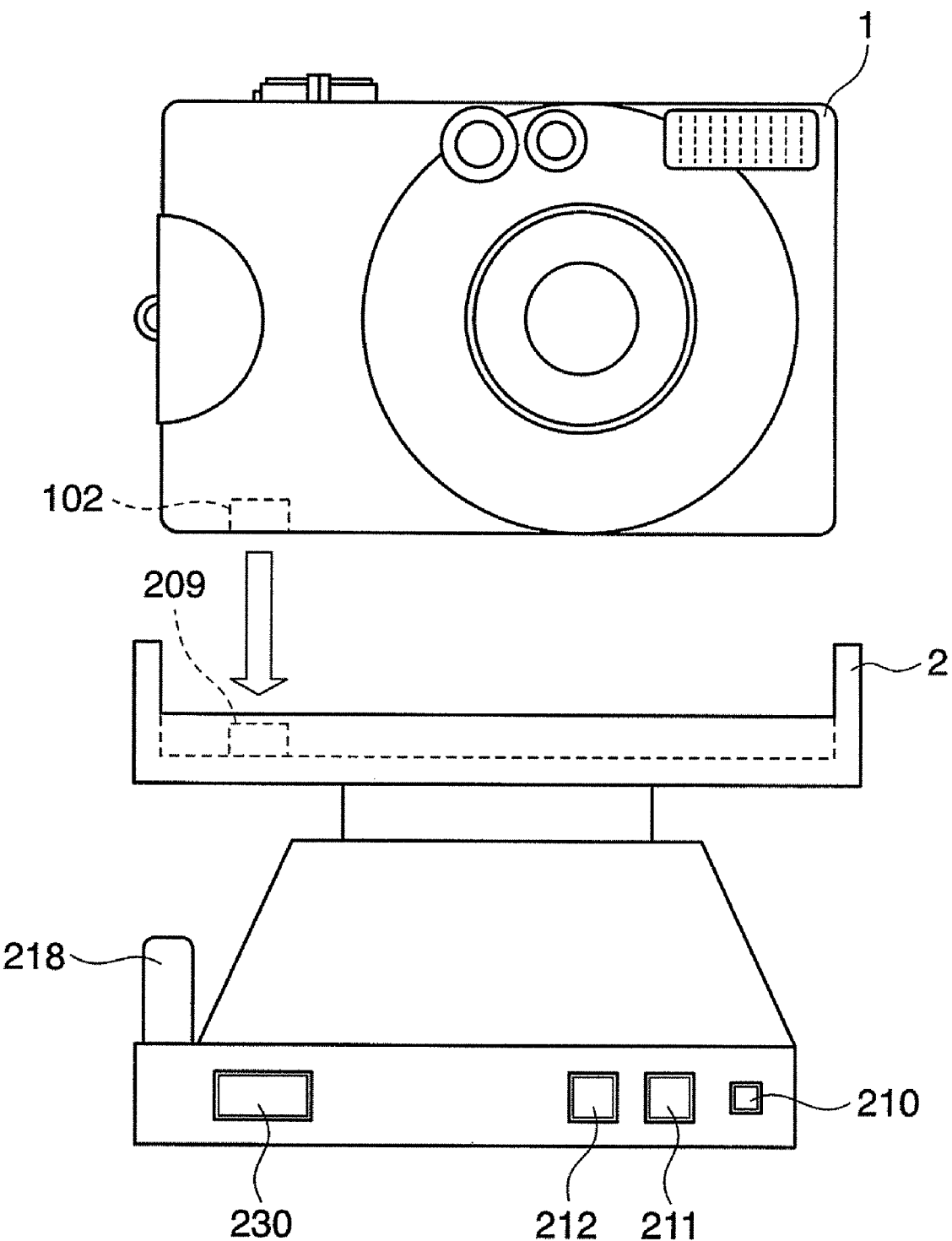
FIG. 5 is a view for explaining the operation of mounting the camera according to the preferred embodiment of the present invention is mounted on the camera cradle apparatus.

FIG. 4 is a schematic front view of an arrangement in which the DSC 1 is mounted on the camera cradle apparatus 2. FIG. 5 is a view showing a method of mounting the DSC 1 on the camera cradle apparatus 2. An extension connector 102 of the DSC 1 and an extension connector 209 of the camera cradle apparatus 2 are used to connect signal lines that transmit the signals 6 described above when the DSC 1 is mounted on the camera cradle apparatus 2. A USB connector 210 of the camera cradle apparatus 2 can be used to connect a PC or a printer (not shown) to a USB interface through a USB cable (not shown). An external power supply button 211 controls the power supply of the DSC 1 by using a signal line that transmits the signals 6 described above. The details of this portion will be described later. In this case, the external power supply button is a toggle switch, of the power supply buttons designed to turn on/off the power supply of the camera, which is mounted on each device connected to the outside of the camera. An infrared receiving unit 230 receives infrared light from a remote control unit (not shown). A copy button 212 functions as an instruction button when image data in the DSC 1 is read out to a storage (not shown) in the camera cradle apparatus 2. A wireless LAN antenna 218 is used for connection to the AP 4 by using signals through the wireless LAN 8. A DC jack 21 is placed on the rear surface (not shown) of the camera cradle apparatus 2. When an AC adapter 20 is connected to the DC jack 21, power is supplied. As shown in FIG. 5, when the DSC 1 is mounted on the upper portion of the camera cradle apparatus 2, the extension connector 102 is automatically connected to the extension connector 209, thereby setting the state shown in FIG. 4. The camera cradle apparatus 2 can swing (tilt) in the vertical direction and rotate (pan) in the horizontal direction while the DSC 1 is mounted. The camera cradle apparatus 2 can also perform zooming operation by transmitting a command to the DSC 1 using the USB interface.

The basic operation of this system will be described below by using the above arrangement.

Data in the DSC 1 is transferred to the camera cradle apparatus 2 through the USB interface, is transferred from the camera cradle apparatus 2 to the AP 4 through the wireless LAN 8, and is transferred from the AP 4 to the PC 5 through the wired LAN 9. For example, a viewfinder image (a moving image with a resolution of about 320×240) from the DSC 1 is sent to the PC 5 through the above route. Such data is transferred from the PC 5 to the DSC 1 through the reverse route. The user operates the PC 5 to transmit pan, tilt, and zoom commands to the camera cradle apparatus 2 and issue an instruction to perform photography at a desired photographing position while seeing the transferred image. A corresponding photography command is sent from the PC 5 to the DSC 1 through the above route. Upon receiving the photography command, the DSC 1 photographs a still image with a resolution of 1,600×1,200 dots, and transmits the image to the PC 5 again through the above route. In this manner, remote photography can be performed by using the PC 5.

Figure 1:
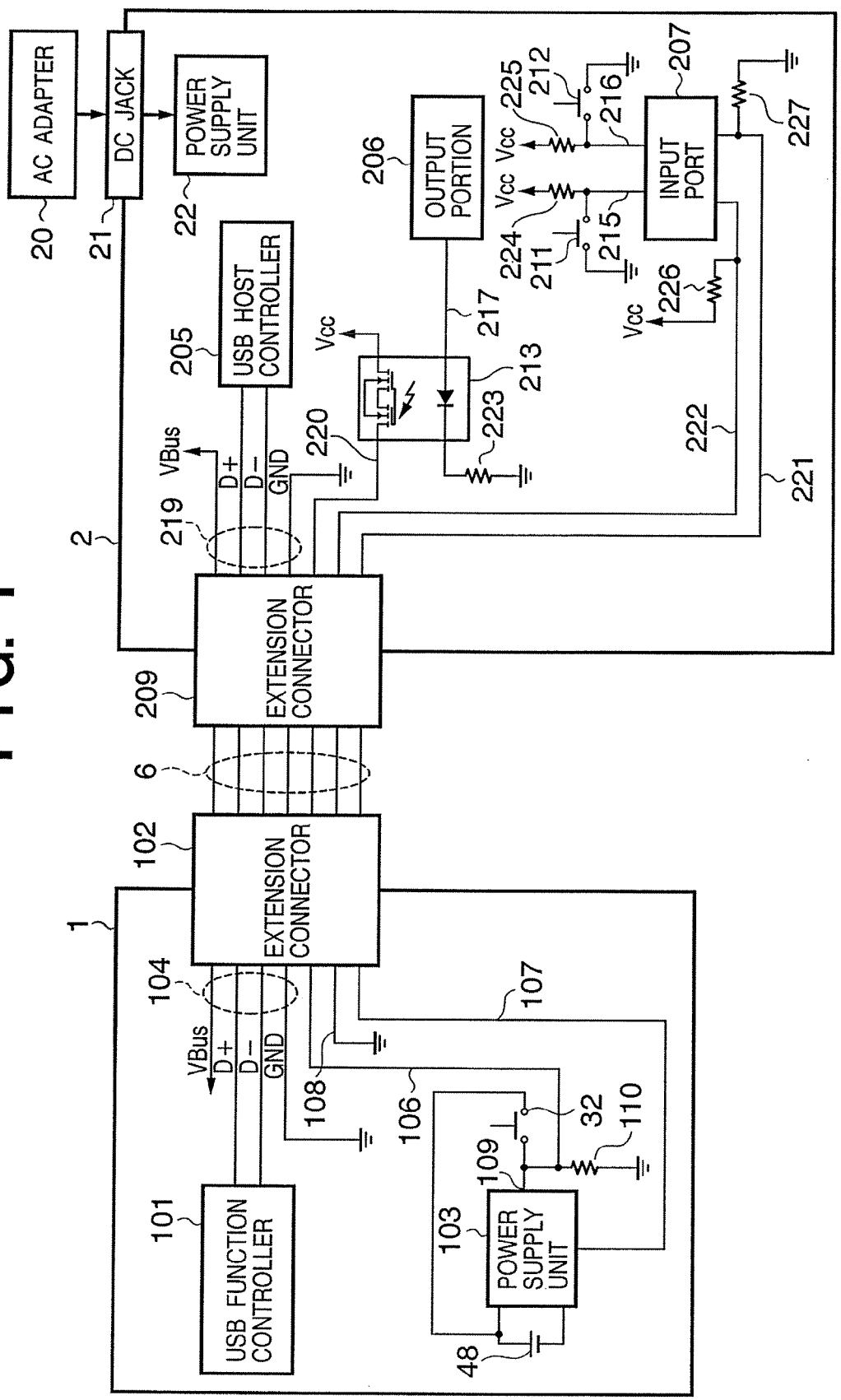
FIG. 1 is a block diagram showing the detailed arrangement of a camera cradle system according to a preferred embodiment of the present invention.
Figure 7:
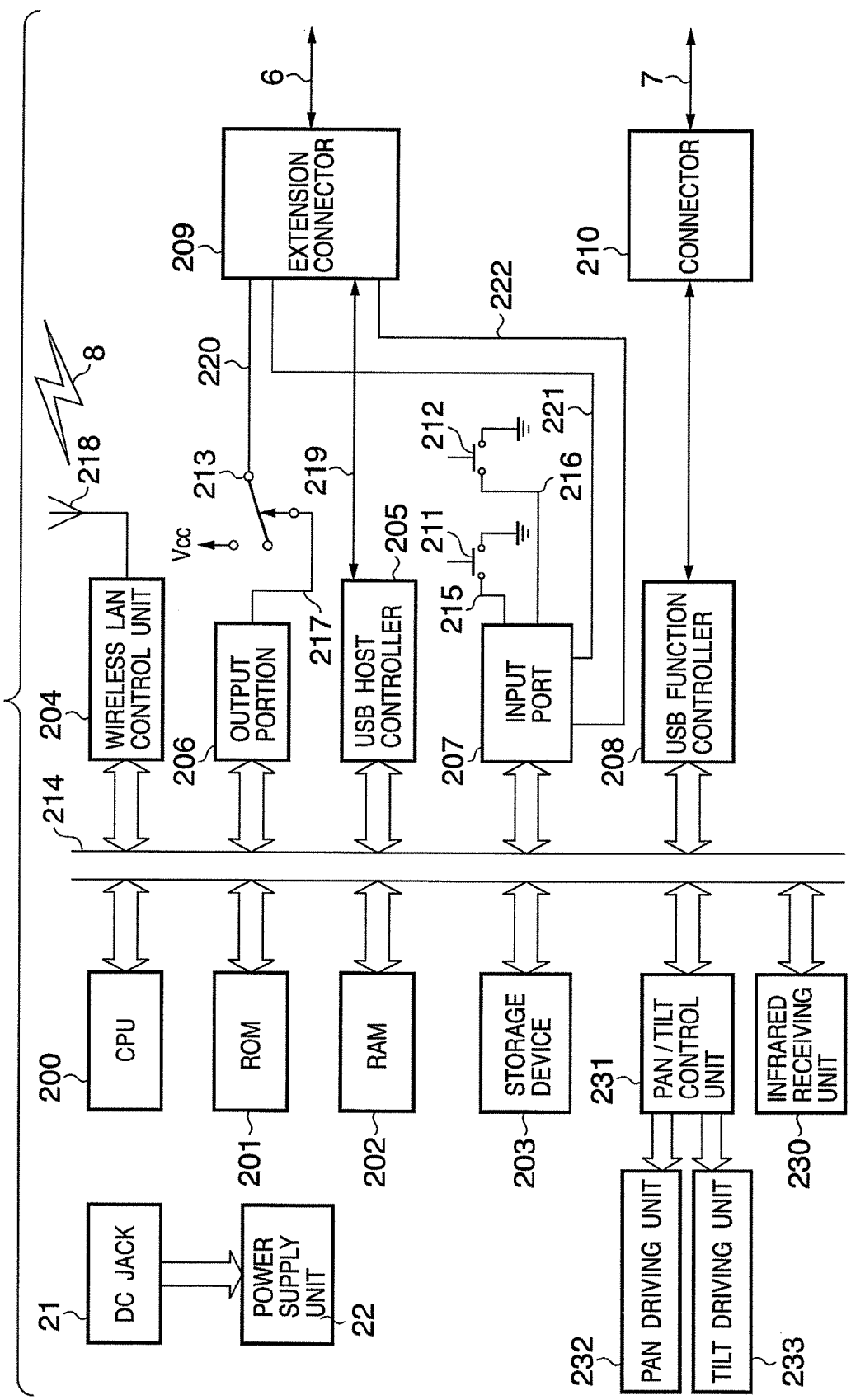
FIG. 7 is a block diagram showing the arrangement of the camera cradle apparatus according to the preferred embodiment of the present invention.

FIG. 7 is a schematic internal block diagram of the camera cradle apparatus 2. When the AC adapter 20 in FIG. 1 is connected to the DC jack 21, the supply of power to each unit of the camera cradle apparatus 2 through a power supply unit 22 is started. A CPU 200 which performs overall control on the camera cradle apparatus 2 is connected to a system bus 214. A ROM 201 stores programs and various data. A RAM 202 is used to load and execute a program and is used as various kinds of work areas. A storage device 203 comprises a hard disk and a hard disk controller. The infrared receiving unit 230 receives infrared light from the remote controller. A wireless LAN control unit 204 can be connected to the AP 4 through the antenna 218 using a radio signal 8. A USB host controller 205 is connected to the system bus 214 and the extension connector 209. A USB signal 219 is supplied as some of the signals 6 to the DSC 1 through the extension connector 209 and is used for communication with the DSC 1. An example of such communication includes the relaying of a command from the camera cradle apparatus 2 or a command from the PC 5, the relaying of image data from the DSC 1, the relaying of the data to the PC 5, and the like. A switch 213 supplies an output signal 220 as some of the signals 6 to the DSC 1 through the extension connector 209, thereby controlling the power supply of the DSC 1. One terminal of the switch 213 which is located on the input side is connected to a power supply Vcc, and the other terminal is not connected to the power supply Vcc. The switch 213 is switched by an output signal 217 from an output portion 206 to control the power supply of the DSC 1. When the output signal 217 is at LOW level, the switch 213 is set to the low contact side. When the output signal 217 is at HIGH level, the switch 213 is set to the high contact side to output the power supply Vcc to the output signal 220.

Although described in detail later, the output signal 220 has a function equivalent to the power supply button 32 of the DSC 1. By outputting the power supply Vcc as the output signal 220 for a predetermined period of time, the power supply of the DSC 1 can be controlled. The external power supply button 211 described above is connected to an input port 207 through a signal 215, and the copy button 212 described above is connected to the input port 207 through a signal 216. Input signals 221 and 222 as parts of the signals 6 are input to the input port 207 through the extension connector 209. The input signals 221 and 222 are used to detect the power supply state of the DSC 1 and the mount state of the DSC 1 on the camera cradle apparatus 2. Reference numeral 208 denotes a USB function controller which is used for communication with a device connected to the connector 210; and 231, a pan/tilt control unit which controls a pan driving unit 232 and a tilt driving unit 233 so as to perform pan/tilt operation.

Figure 6:
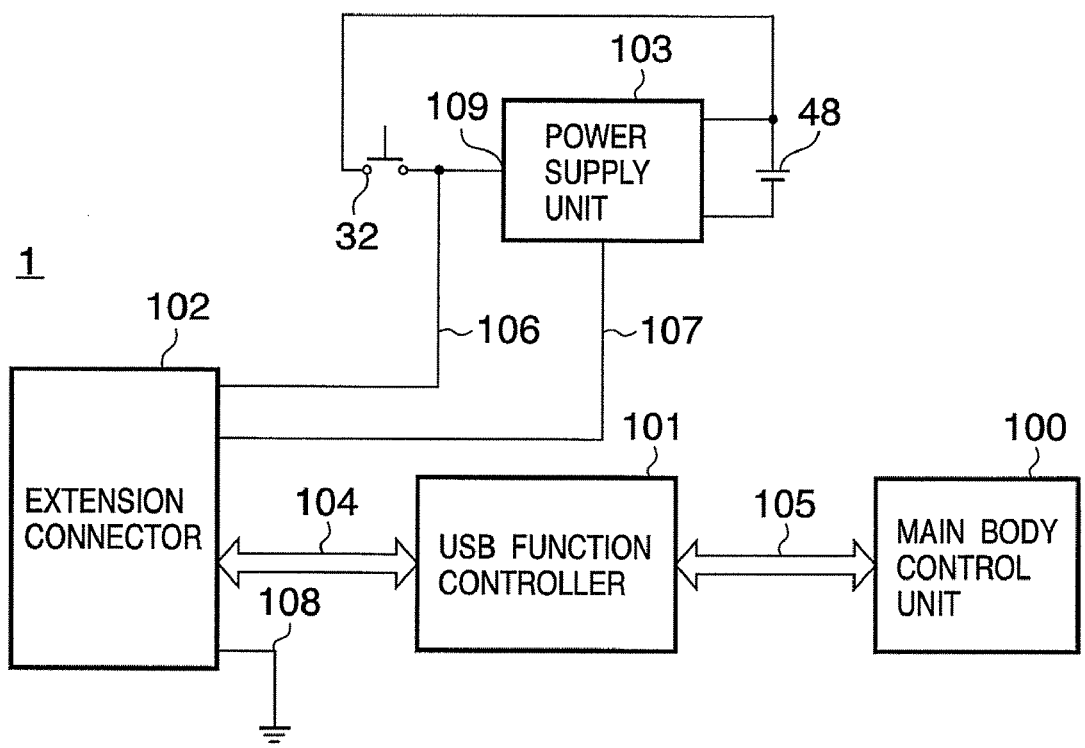
FIG. 6 is a block diagram showing the arrangement of the camera according to the preferred embodiment of the present invention.

FIG. 6 is a block diagram of the DSC 1, and shows the main part of a preferred embodiment of the present invention. A main body control unit 100 includes a system bus 105 and the like, and performs overall control on the DSC 1. A USB function controller 101 is connected to the system bus 105. A signal line 104 for a USB signal is connected to the USB function controller 101. A power supply unit 103 receives power from the battery 48 and functions as a power supply required for each unit of the DSC 1. One terminal of the power supply button 32 is connected to the battery 48, and the other terminal is connected to a switch terminal 109 of the power supply unit 103. If the power supply of the DSC 1 is off and the user presses the power supply button 32 for a predetermined period of time or more (turns on the power supply button 32), the power supply of the DSC 1 is turned on. In contrast, if the user presses the power supply button 32 while the power supply is on, the power supply of the DSC 1 is turned off. A signal line 106 for control signals is connected to the switch terminal 109 of the power supply unit 103, and is connected as the signal 6 to the camera cradle apparatus 2, together with the signal line 104 for USB signals, through the extension connector 102. The signal 106 is equivalent to the control signal 220 on the camera cradle apparatus 2, and is used to control the power supply of the DSC 1. If the output signal 217 from the output portion 206 on the camera cradle apparatus 2 is set at HIGH level for a predetermined period of time, the power supply Vcc is output to the control signal 106 for the period. This operation is equivalent to pressing the power supply button 32. With this operation, the camera cradle apparatus 2 can turn on/off the power supply of the DSC 1 by using the output signal 217. A signal line 107 for power supply output is connected as part of the signal 6 to the camera cradle apparatus 2 through the extension connector 102 to supply a power supply output from the power supply unit 103 to the extension connector 102. The camera cradle apparatus 2 receives the power supply output through the input signal 221 and detects whether the power supply of the DSC 1 is on or off. A signal line 108 is connected to GND, and is a signal for the detection of the mount state of the DSC 1 on the camera cradle apparatus 2. The camera cradle apparatus 2 receives this signal as the input signal 222, and detects whether the DSC 1 is mounted on the camera cradle apparatus 2.

FIG. 1 is a block diagram showing the DSC 1 and the camera cradle apparatus 2, and shows the connector between them for the sake of explanation. FIG. 1 shows a case wherein the switch 213 comprises an optical MOSFET. The USB function controller 101 is connected to the extension connector 102. The signal line 104 for USB signals is connected to the USB host controller 205 of the camera cradle apparatus 2 through the extension connector 102, some of the signals 6, and the extension connector 209. The power supply unit 103 receives power from the battery 48, and supplies power required for each unit of the DSC 1. The power supply button 32 is connected to the switch terminal 109 of the power supply unit 103. In normal times, the power supply button 32 is off, and the switch terminal 109 is set at LOW level by a pull-down resistor. When the user presses the power supply button 32 for a predetermined period of time, a voltage is applied from the battery 48 to the switch terminal 109. When the power supply of the DSC 1 is turned off, the power supply is turned on, and vice versa. The signal line 108 for a signal for detecting the mount state of the DSC 1 on the camera cradle apparatus 2 is connected to GND. The signal line 108 is connected to a signal line for the input signal 222 to the input port 207 through some of the signals 6 and the extension connector 209. The signal line for the input signal 222 is pulled up by a resistor 226 to be set at HIGH level when the DSC 1 is not mounted on the camera cradle apparatus 2. When the DSC 1 is mounted on the camera cradle apparatus 2, the signal line 108 is connected to GND and hence is set at LOW level. This makes it possible to discriminate whether the DSC 1 is mounted on the camera cradle apparatus 2. The signal line 107 is used to supply a power supply output from the power supply unit 103. A power supply output from the DSC 1 is output only when the power supply is on. The signal line 107 is connected to the signal line for the input signal 221 to the input port 207 through some of the signals 6 and the extension connector 209. The signal line for the input signal 221 is pulled down by a resistor 227, and is set at HIGH level only when the DSC 1 is mounted on the camera cradle apparatus 2 and the power supply of the DSC 1 is on. That is, the input signal 222 makes it possible to discriminate whether the DSC 1 is mounted, and the input signal 221 makes it possible to discriminate the state of the power supply when the DSC 1 is mounted. One terminal of a photocurrent limiting resistor 223 is connected to the cathode terminal of a photodiode in the optical MOSFET 213, and the other terminal is grounded. The signal line for the output signal 217 from the output portion 206 is connected to the anode terminal of the photodiode. The power supply Vcc is connected to one terminal of the FET, and the output signal 220 is connected to the other terminal of the FET. The output signal 220 is connected to the switch terminal 109 of the power supply unit 103 through some of the signals 6 and the extension connector 102. When the output signal 217 is set at HIGH level for a predetermined period of time, the output signal 220 is set at power supply Vcc level. This makes it possible to apply the power supply Vcc to the switch terminal 109. That is, a state equivalent to the state wherein the power supply button 32 is pressed is set. The power supply button 211 and the copy button 212 are connected to the input port 207 through the signals 215 and 216, respectively, and are pulled up by resistors 224 and 225, respectively. In normal times, therefore, these buttons are set at HIGH level. When the buttons are pressed, they are set at LOW level. The camera cradle apparatus 2 also comprises the DC jack 21. When the AC adapter 20 is connected to the DC jack 21, power is supplied to each unit of the camera cradle apparatus 2 through the power supply unit 22, thereby allowing each unit to operate.

Figure 8:
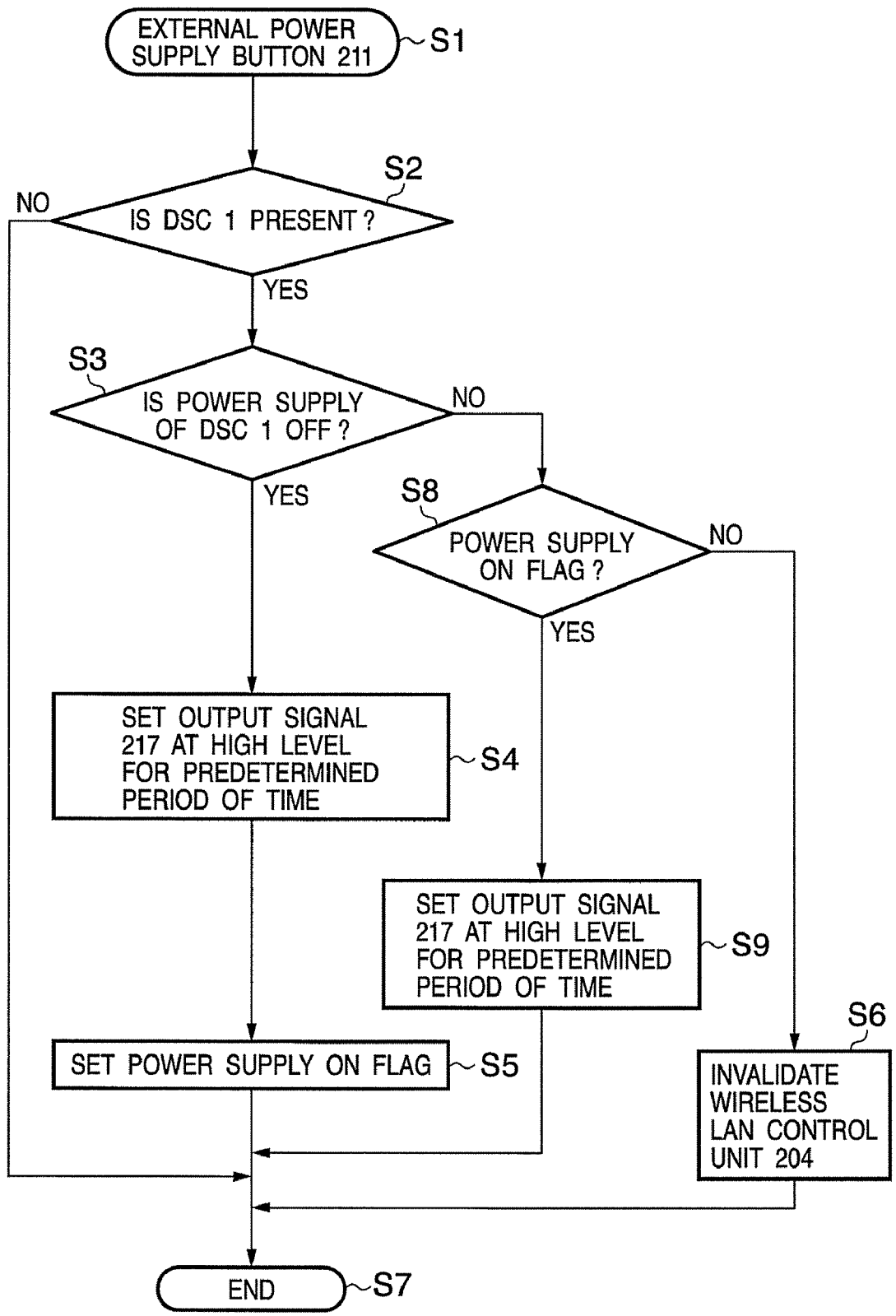
FIG. 8 is a flowchart for explaining the operation of the camera cradle apparatus according to the first preferred embodiment of the present invention.

A method of controlling the power supply of the DSC 1 with the above arrangement will be described. FIG. 8 is a flowchart showing a method of controlling the power supply of the DSC 1 from the camera cradle apparatus 2. This flowchart starts when the user presses the external power supply button 211 of the camera cradle apparatus 2 while the power supply of the camera cradle apparatus 2 is on.

In step S1, the camera cradle apparatus 2 detects that the external power supply button 211 is pressed.

In step S2, the camera cradle apparatus 2 checks the level of the input signal 222. If the input signal 222 is at LOW level ("Yes" in step S2), it is determined that the DSC 1 is mounted, and the flow advances to step S3. If the input signal 222 is at HIGH level ("No" in step S2), it is determined that the DSC 1 is not mounted. The flow then advances to step S7 to terminate the processing.

In step S3, the camera cradle apparatus 2 checks the level of the input signal 221 to check the on/off state of the power supply of the DSC 1. If the input signal 221 is at LOW level ("Yes" in step S3), since the power supply of the DSC 1 is off, the flow advances to step S4. If the input signal 221 is at HIGH level ("No" in step S3), since the power supply of the DSC 1 is on, the flow advances to step S8.

In step S4, the camera cradle apparatus 2 turns on the power supply of the DSC 1 by setting the output signal 217 at HIGH level for a predetermined period of time.

In step S5, the camera cradle apparatus 2 sets a power supply on flag indicating that the power supply of the DSC 1 is turned on on the camera cradle apparatus 2 side. The flow then advances to step S7 to terminate the processing. Subsequently, the system operates in a "network mode" of responding to access from a device on the LAN, e.g., the PC 5. The network mode is a mode in which a viewfinder image (a moving image with a resolution of about 320×240 dots) from the DSC 1 is sent to the PC 5 through the route of DSC 1→camera cradle apparatus 2→AP 4→PC 5. When the user issues an instruction to perform photography after issuing pan/tilt/zoom instructions and the like while seeing the sent image, corresponding pan/tilt/zoom/photography commands are sent from the PC 5 to the DSC 1 or the camera cradle apparatus 2 through a route reverse to the above route. Upon receiving the photography command, the DSC 1 photographs a still image with a resolution of 1,600×1,200 dots, and transmits it to the PC 5 through the above route again. Remote photography using the PC 5 in this manner is a typical application in the network mode.

In step S8, the camera cradle apparatus 2 checks the power supply on flag. This flag is the flag set in step S5 when the camera cradle apparatus 2 turns on the power supply of the DSC 1. If it is determined in step S8 that the power supply on flag has already been set ("Yes" in step S8), the output signal 217 is set at HIGH level for a predetermined period of time in step S9. With this operation, the power supply of the DSC 1 is prohibited, and the flow advances to step S7 to terminate the processing. If it is determined in step S8 that the power supply on flag has not been set (the power supply of the DSC 1 is on in spite of the fact that the power supply of the DSC 1 is not turned on the camera cradle apparatus 2 side) ("No" in step S8), the wireless LAN control unit 204 is invalidated in step S6. Alternatively, subsequently, data transfer with an external network device including the AP 4 through the wireless LAN control unit 204 is interrupted. The flow then advances to step S7 to terminate the processing. That is, a "local mode" is set in which the power supply of the DSC 1 is turned on through the power supply button 32. The local mode is a basic function of the DSC 1 and is a mode including photography/playback of images by the DSC 1 and communication with the DSC 1 and the camera cradle apparatus 2. For example, the following are typical applications in the local mode. They include image transfer from the DSC 1 to the camera cradle apparatus 2 through the operation button 47 and image copying from the DSC 1 to the camera cradle apparatus 2 through the copy button 212 of the camera cradle apparatus 2.

The operation of the DSC 1 does not operate differently in the network mode and the local mode except when the user explicitly changes the mode. The operations in these modes differ in whether access from an external device on the network is prohibited on the camera cradle apparatus 2 side. In addition, control is performed such that even if the pressing of the power supply button 211 of the camera cradle apparatus 2 is detected, any instruction to shut down the power supply of the DSC 1 is not issued in step S6 to indicate that the local mode is set.

As described above, when the power supply button of the DSC 1 is pressed, the system operates in the local mode in which access from the network is prohibited. When the external power supply button is pressed on the camera cradle apparatus, the system operates in the network mode in which access from the network is permitted. This makes it possible to realize a system which allows a user to explicitly designate an operation mode by intuitive operation.

In addition, there can be realized a system which prohibits the power supply from being shut down during local mode operation to prevent the power supply from being accidentally shut down during local mode operation.

Second Embodiment

The first embodiment has exemplified the case wherein power supply control is performed by using a power supply button 32 of a DSC 1 and an external power supply button 211 of a camera cradle apparatus 2. In contrast to this, in the second embodiment, power supply control using a remote control unit (to be referred to as a "remote controller" hereinafter) is additionally performed.

The following description will focus on additional and different portions with respect to the first embodiment. Note that the same reference numerals denote the same constituent elements as those in the first embodiment.

Figure 9:
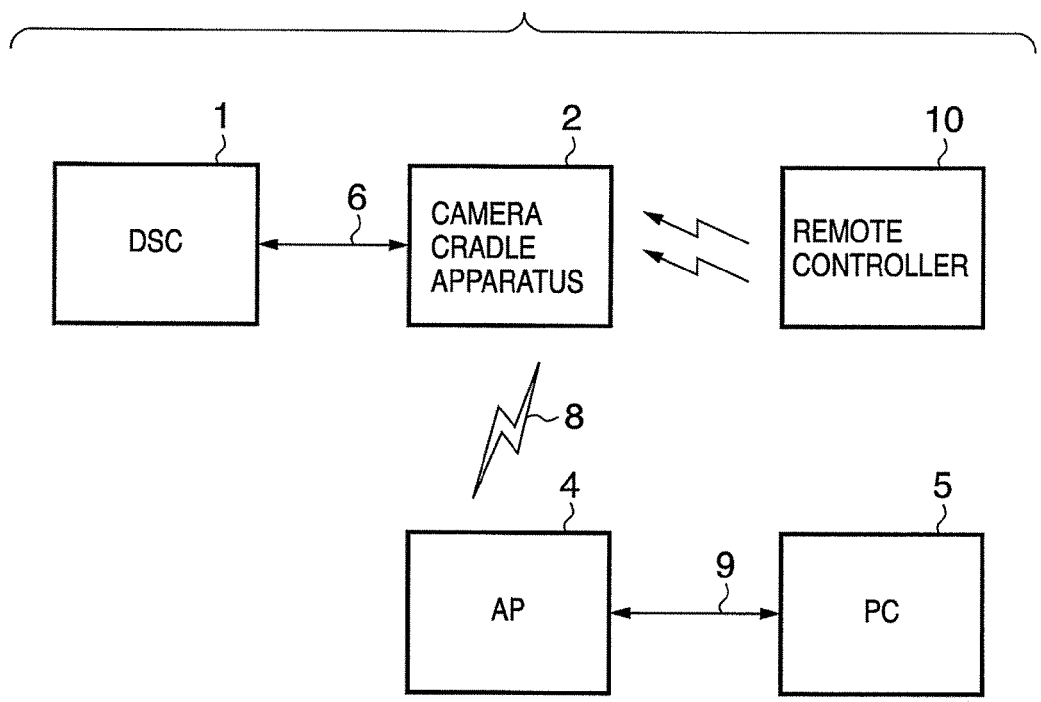
FIG. 9 is a block diagram showing the arrangement of a camera cradle apparatus according to the second preferred embodiment of the present invention.

FIG. 9 is a block diagram showing the arrangement of a camera cradle system comprising a DSC 1 and a camera cradle apparatus 2. The camera cradle apparatus 2 comprises a remote controller 10 including an infrared emitting unit. The camera cradle apparatus 2 operates under the remote controller 10. Other portions are the same as those in the first embodiment.

Figure 10:
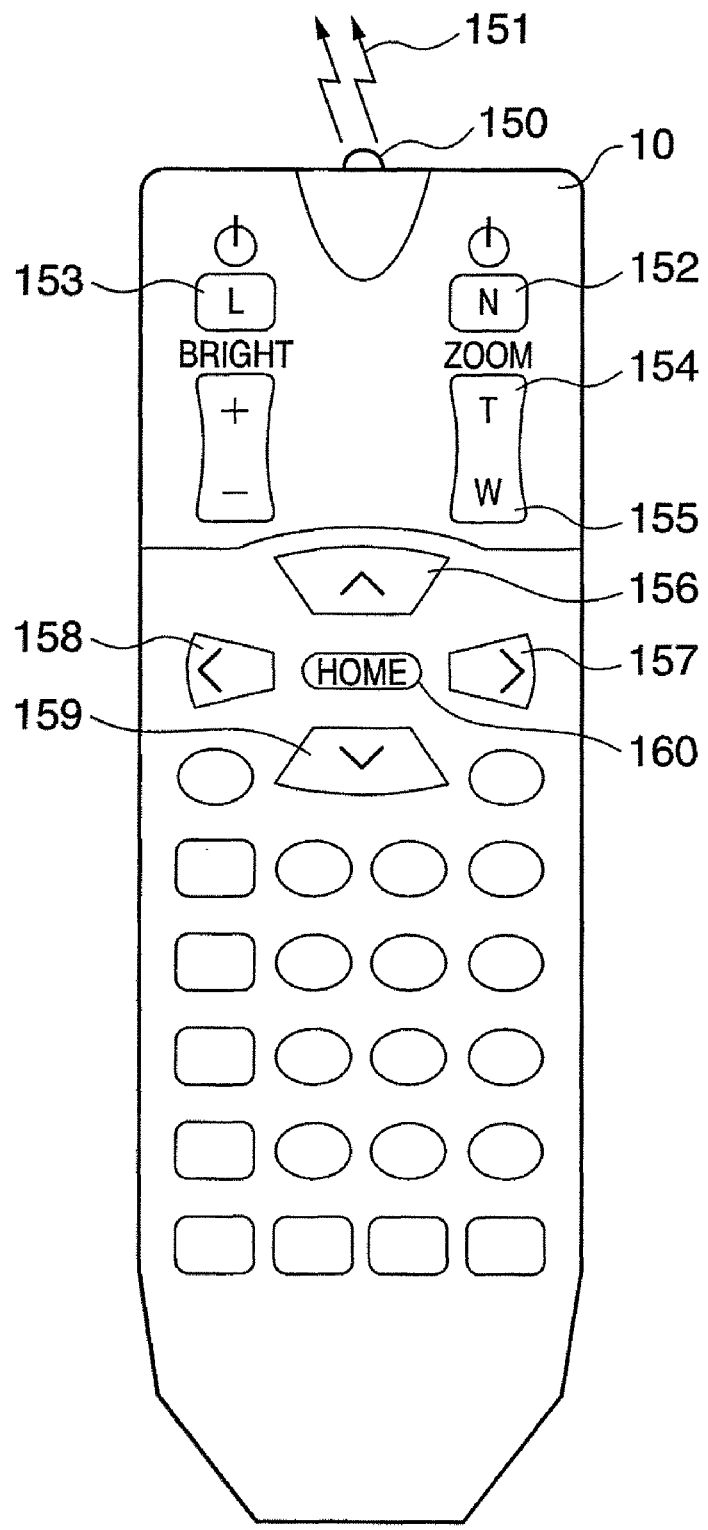
FIG. 10 is a schematic view of a remote control unit according to the second preferred embodiment of the present invention.

FIG. 10 is a schematic view of the remote controller 10. The remote controller 10 comprises an infrared emitting unit 150 and is designed to output infrared light 151. The remote controller 10 encodes a pressed key and transmits the resultant data to an infrared receiving unit 230 of the camera cradle apparatus 2. A network mode external power supply button 152 is used in the network mode. A local mode external power supply button 153 is used in the local mode. A zoom-in instruction key 154 and a zoom-out instruction key 155 are used to switch zoom magnifications of the DSC 1 through the camera cradle apparatus 2. A tilt-up instruction key 156 and a tilt-down instruction key 159 are used for orienting the DSC 1 in the vertical direction using the tilt mechanism of the camera cradle apparatus 2. Pan instruction keys 157 and 158 are used to change the orientation of the DSC 1 in the horizontal direction using the pan mechanism of the camera cradle apparatus 2. A HOME key 160 is used to move the position of the DSC 1 which has been changed by the above pan, tilt, and zoom mechanisms to the initial position.

Figure 11:
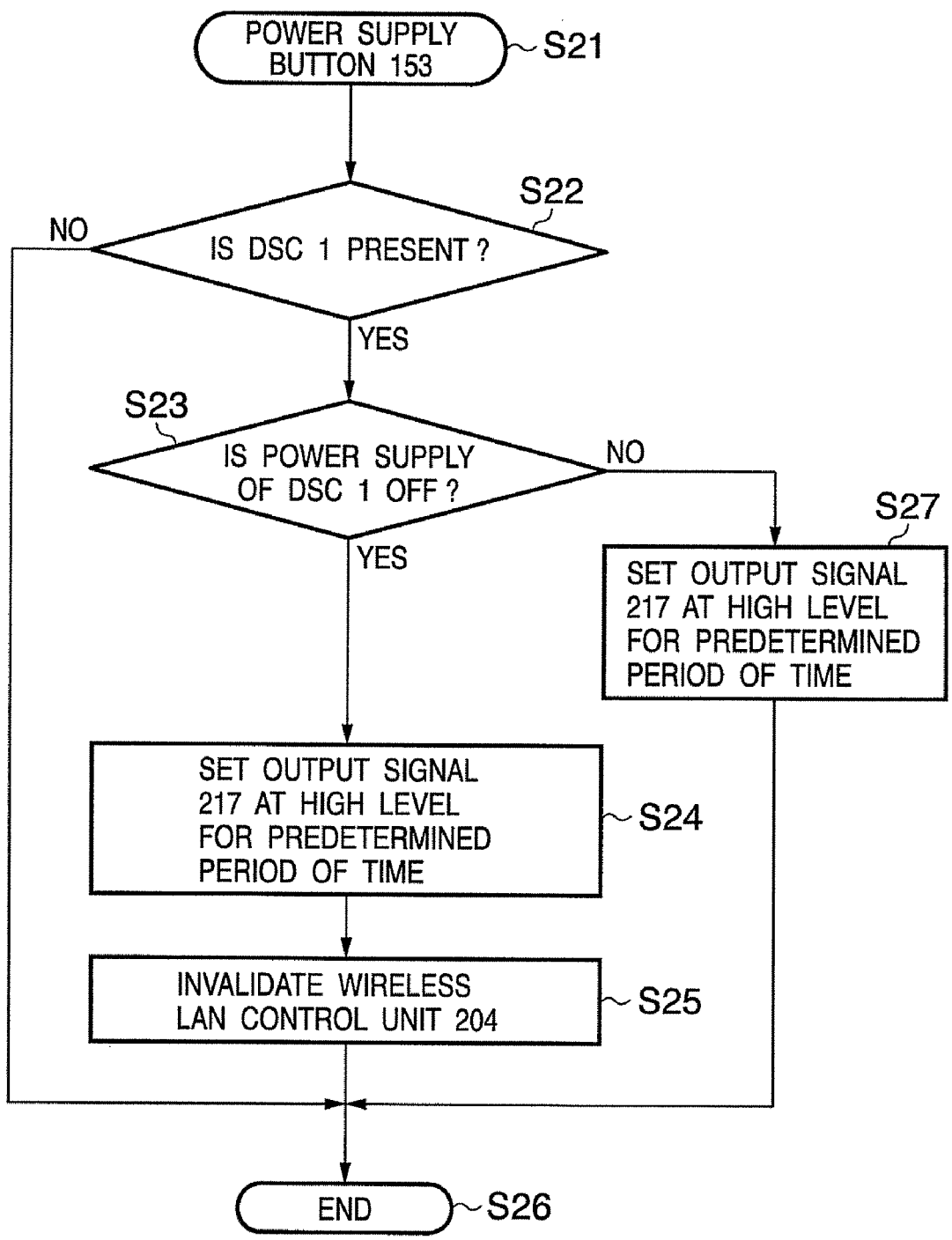
FIG. 11 is a flowchart for explaining the operation of the camera cradle apparatus according to the second preferred embodiment of the present invention.
Figure 12:
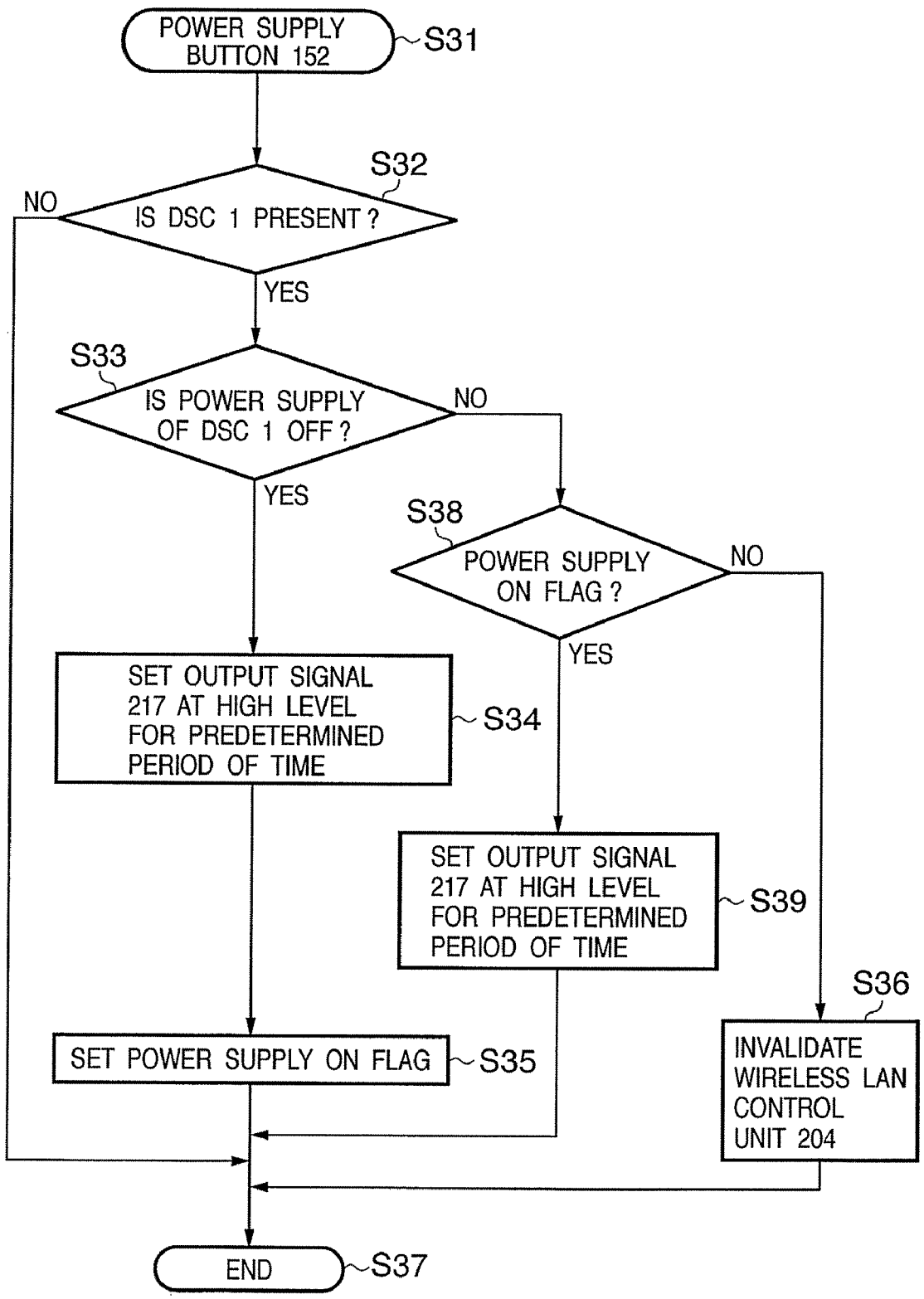
FIG. 12 is a flowchart for explaining the operation of the camera cradle apparatus according to the second preferred embodiment of the present invention.

A method of controlling the power supply of the camera cradle apparatus 2 with the above arrangement will be described with reference to FIGS. 11 and 12. FIGS. 11 and 12 are flowcharts showing a method in which when the user presses the power supply control key of the remote controller 10, a corresponding key code is transmitted to the camera cradle apparatus 2 through infrared light. The flowchart of FIG. 11 starts when the local mode external power supply button 153 is pressed and a corresponding key code is received while the power supply of the camera cradle apparatus 2 is on.

In step S21, the camera cradle apparatus 2 receives the key code from the local mode external power supply button 153.

In step S22, the camera cradle apparatus 2 checks the level of an input signal 222. If the level of the input signal 222 is LOW level ("Yes" in step S22), it is determined that the DSC 1 is mounted, and the flow advances to step S23. If the level of the input signal 222 is HIGH level ("No" in step S22), since the DSC 1 is not mounted, the flow advances to step S26 to terminate the processing.

In step S23, the camera cradle apparatus 2 checks the level of an input signal 221 to check the on/off state of the power supply of the DSC 1. If the level of the input signal 221 is LOW level ("Yes" in step S23), it is determined that the power supply of the DSC 1 is off, and the flow advances to step S24. If the level of the input signal 221 is HIGH level ("No" in step S23), since the power supply of the DSC 1 is on, the flow advances to step S27.

In step S24, the camera cradle apparatus 2 turns on the power supply of the DSC 1 by setting an output signal 217 at HIGH level for a predetermined period of time.

In step S25, the camera cradle apparatus 2 invalidates a wireless LAN control unit 204 or prohibits the subsequent relaying of any command or data from the network to the DSC 1. Thereafter, the flow advances to step S26 to terminate the processing. In this case, the system operates in the "local mode". In addition, since there is no step of setting a flag like step S5 in FIG. 8, no power supply on flag is set. If, therefore, the external power supply button 211 is pressed in this state, the processing is terminated without performing any power supply control through the route of step S1→step S2→step S3→step S8→step S6→step S7 in FIG. 8. That is, if the power supply of the DSC 1 is turned on with the local mode external power supply button 153 in the local mode, the power supply of the DSC 1 cannot be shut down by using the external power supply button 211 of the camera cradle apparatus 2.

In step S27, the camera cradle apparatus 2 shuts down the power supply of the DSC 1 by setting the output signal 217 at HIGH level for a predetermined period of time. The flow then advances to step S26 to terminate the processing. In this case, since there is no step of checking the power supply on flag like step S8 in FIG. 8, the power supply of the DSC 1 is shut down when the power supply is turned on with any of the power supply control buttons 32, 211, 152, and 153.

The flowchart of FIG. 12 starts when the network mode external power supply button 152 is pressed and a corresponding key code is received while the power supply of the camera cradle apparatus 2 has been turned on.

In step S31, the camera cradle apparatus 2 receives a key code from the network mode external power supply button 152.

In step S32, the camera cradle apparatus 2 checks the level of the input signal 222. If the level of the input signal 222 is LOW level ("Yes" in step S32), it is determined that the DSC 1 is mounted, and the flow advances to step S33. If the level of the input signal 222 is HIGH level ("No" in step S32), it is determined that the DSC 1 is not mounted, and the flow advances to step S37 to terminate the processing.

In step S33, the camera cradle apparatus 2 checks the level of the input signal 221 to check the on/off state of the power supply of the DSC 1. If the level of the input signal 221 is LOW level ("Yes" in step S33), it is determined that the power supply of the DSC 1 is off, and the flow advances to step S34. If the level of the input signal 221 is HIGH level ("No" in step S33), it is determined that the power supply of the DSC 1 is on, and the flow advances to step S38.

In step S34, the camera cradle apparatus 2 turns on the power supply of the DSC 1 by setting the output signal 217 at HIGH level for a predetermined period of time.

In step S35, the camera cradle apparatus 2 sets the power supply on flag indicating that the power supply of the camera cradle apparatus is on. The flow then advances to step S37 to terminate the processing. This power supply on flag is equivalent to the flag set in step S5 in FIG. 8. Subsequently, the system operates in the "network mode" of responding to access from a device on the LAN, e.g., the PC 5.

In step S38, the camera cradle apparatus 2 checks the power supply on flag. This is the flag which is set in step S35 or step S5 in FIG. 8. This flag is set when the power supply is turned on with the power supply button 152 or 211. If it is determined in step S38 that the power supply on flag is set ("Yes" in step S38), the output signal 217 is set at HIGH level for a predetermined period of time in step S39. With this operation, the power supply of the DSC 1 is shut down, and the flow advances to step S37 to terminate the processing. If it is determined that the power supply on flag is not set ("No" in step S38), the wireless LAN control unit 204 is invalidated in step S36. Alternatively, subsequent data transfer to an external network device including an access point 4 through the wireless LAN control unit 204 is interrupted. Thereafter, the flow advances to step S37 to terminate the processing. In this case, it can be determined that the power supply of the DSC 1 is turned on with the power supply control button 32 or 153, and the "local mode" is set. In this case, the wireless LAN control unit 204 is invalidated in step S36, and access from any network device is prohibited.

As described above, when the power supply button of the DSC or the local mode external power supply button of the remote controller is pressed, the system operates in the local mode of prohibiting access from the network. When the external power supply button of the camera cradle apparatus or the network mode external power supply button of the remote controller is pressed, the system operates in the "network mode" of permitting access from the network. This makes it possible to realize a system which allows the user to explicitly designate an operation mode by intuitive operation.

In addition, the power supply cannot be shut down by the operation of the camera cradle apparatus or the network mode external power supply button of the remote controller during local mode operation. This makes it possible to implement a system which prevents the power supply from being accidentally shut down during local mode operation.

Third Embodiment

The first embodiment has exemplified the case wherein power supply control is performed by the power supply button 32 of the DSC 1 and the external power supply button 211 of the camera cradle apparatus 2. The second embodiment has exemplified the case wherein power supply control is performed by using the power supply button 32 of the DSC 1, the external power supply button 211 of the camera cradle apparatus 2, and the external power supply buttons 152 and 153 of the remote controller. In contrast, in the third embodiment, power supply control is also performed by using a personal computer (a PC 5 in this embodiment) as an external terminal.

Figure 13:
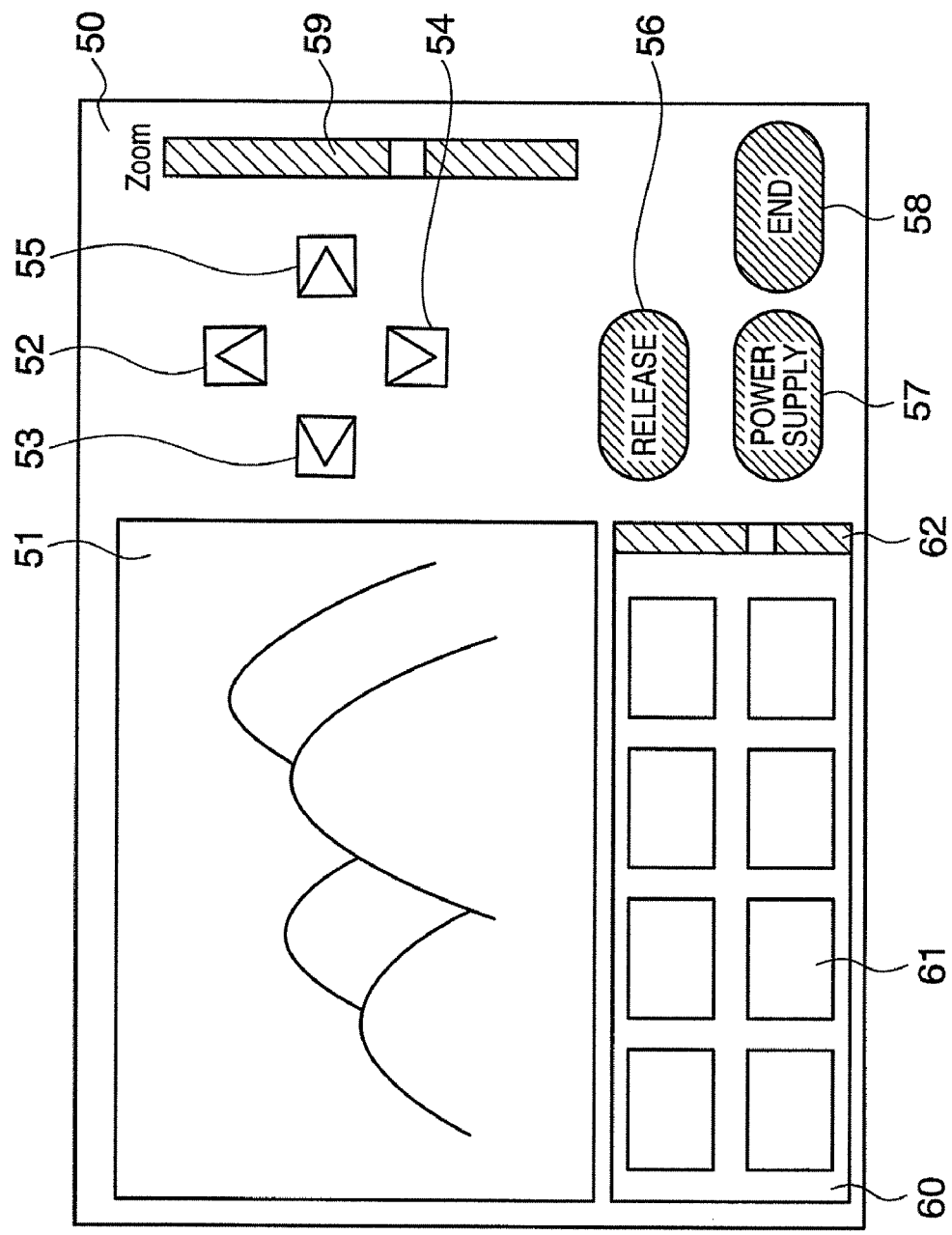
FIG. 13 is a view showing the window display of an external terminal according to the third preferred embodiment of the present invention.

The following description will focus on additional and different portions with respect to the first and second embodiments. FIG. 13 is a view showing an operation window 50 of the PC 5 as an example of an external terminal. A viewfinder image 51 is distributed through a DSC 1, a camera cradle apparatus 2 and an AP 4. In the operation window 50, pan/tilt buttons 52, 53, 54, and 55, a release button 56, an external power supply button 57, and an end button 58 are arranged. A scroll bar 59 is used for zoom operation. A scroll bar 62 is used to scroll a thumbnail image 61 in a thumbnail area 60.

As described above in the above embodiments, in the network mode, control on the camera cradle apparatus 2 and DSC 1 is enabled by the PC 5.

In the network mode, a viewfinder image 51 is sent to the PC 5 through, for example, the route of DSC 1→camera cradle apparatus 2→AP 4→PC 5. The user operates the pan/tilt buttons 52, 53, 54, and 55 and the scroll bar 59 while seeing the viewfinder image 51. As a consequence, corresponding commands are transmitted to the camera cradle apparatus 2 through the route reverse to the above route. Upon reception of the pan/tilt command, the camera cradle apparatus 2 executes pan/tilt operation by controlling a pan driving unit 232 and tilt driving unit 233 through a pan/tilt control unit 231. Upon reception of the zoom command, the camera cradle apparatus 2 executes zoom operation by transferring the command to the DSC 1 through the USB interface. When a desired image position is obtained in this manner, a photography command is transmitted to the camera cradle apparatus 2 in accordance with selecting operation with respect to the release button 56. Upon reception of the photography command, the camera cradle apparatus 2 transfers the command to the DSC 1 through the USB interface to cause the DSC 1 to execute photography. Image data after photography is sent to the PC 5 through the above route.

The power supply control unit using the external power supply button 57 of the PC 5 will be described below with reference to the flowcharts of FIGS. 14, 16, 17, and 18 for the camera cradle apparatus 2.

Figure 14:
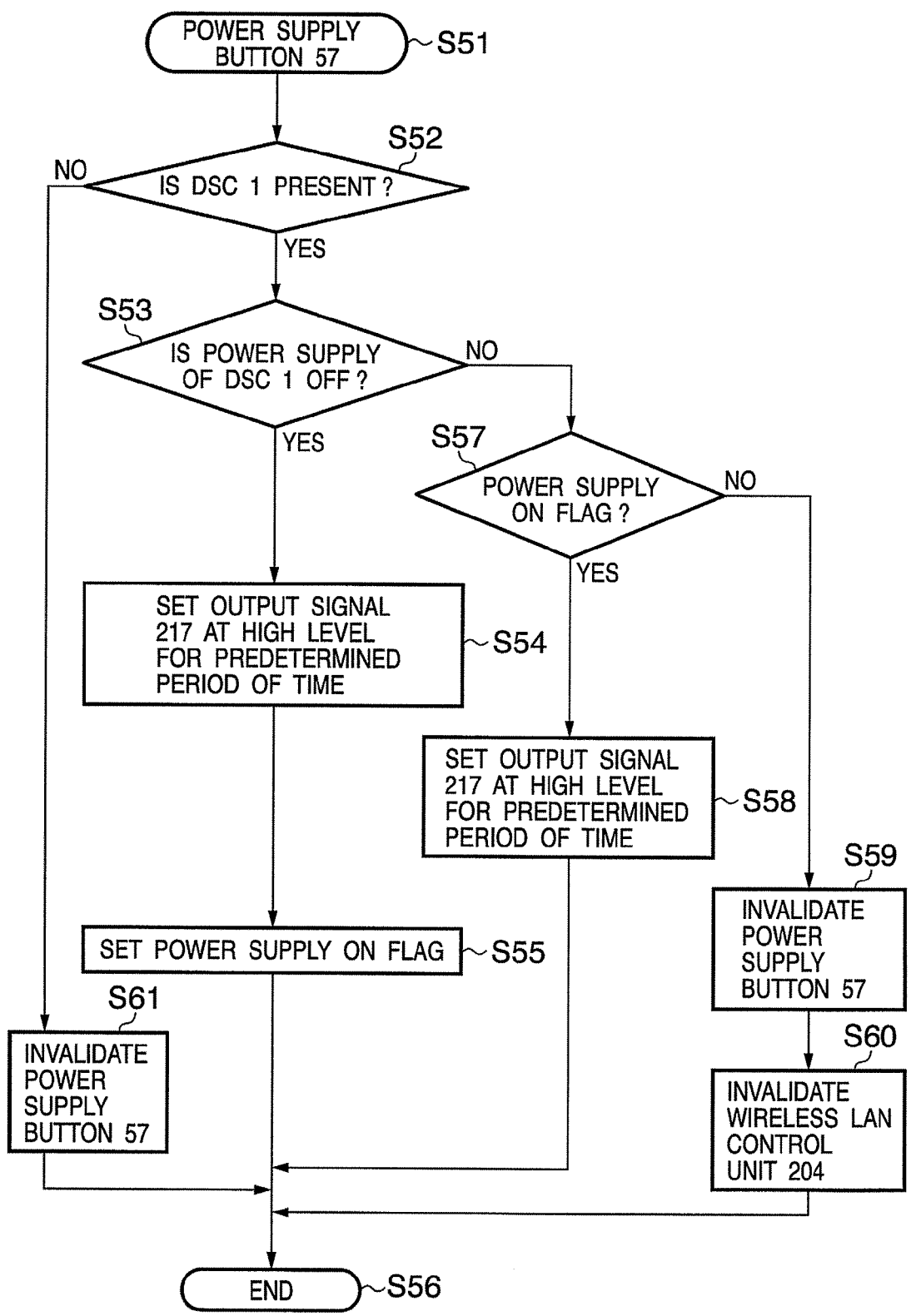
FIG. 14 is a flowchart for explaining the operation of a camera cradle apparatus according to the third preferred embodiment of the present invention.

The flowchart of FIG. 14 starts when a key code indicating that the selecting operation of the external power supply button 57 of the PC 5 is detected is received while the power supply of the camera cradle apparatus 2 is on.

In step S51, the camera cradle apparatus 2 receives a key code from the external power supply button 57.

Figure 15:
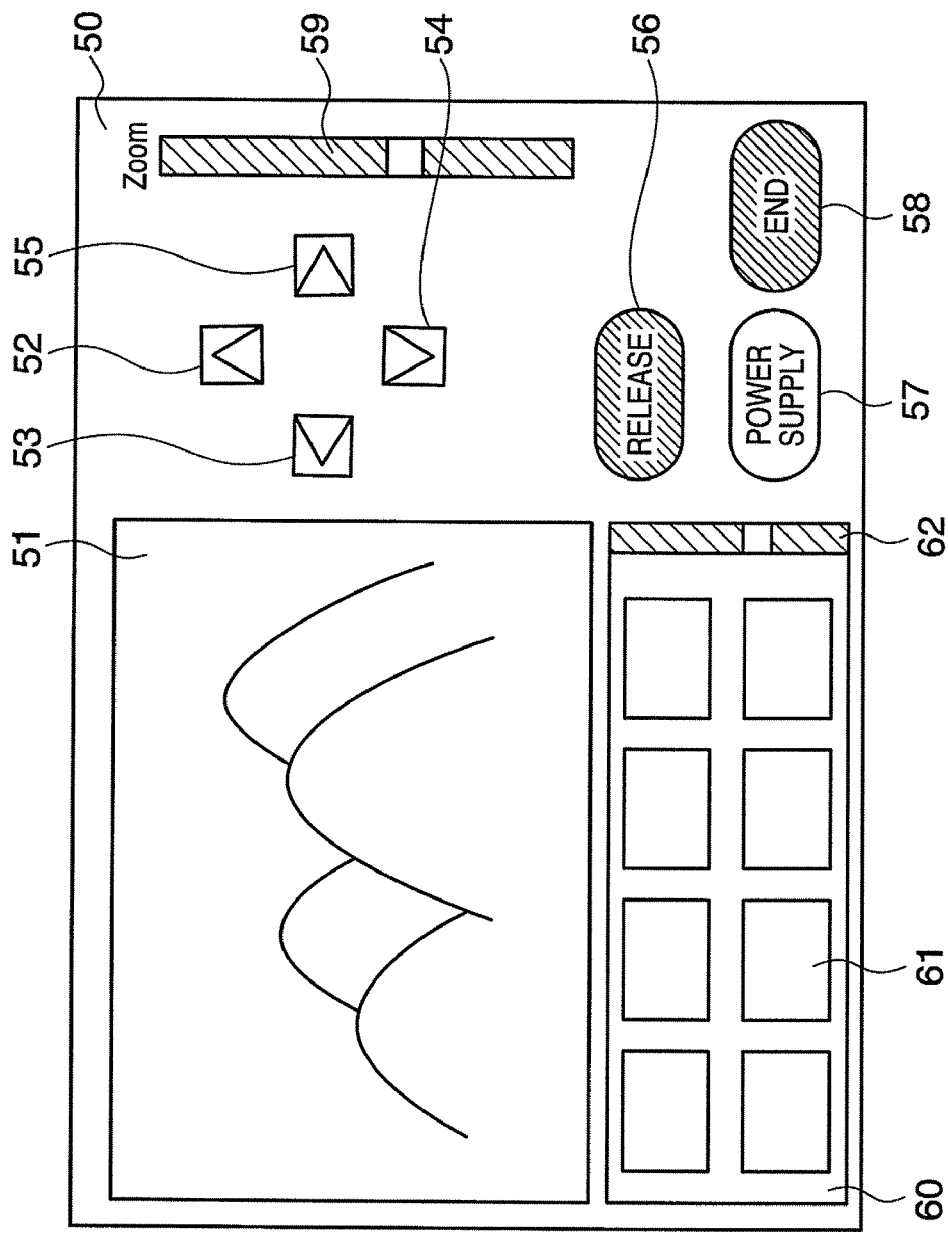
FIG. 15 is a view showing the window display of the external terminal according to the third preferred embodiment of the present invention.

In step S52, the camera cradle apparatus 2 checks the level of an input signal 222. If the level of the input signal 222 is LOW level ("Yes" in step S52), it is determined that the DSC 1 is mounted, and the flow advances to step S53. If the level of the input signal 222 is HIGH level ("No" in step S52), it is determined that the DSC 1 is not mounted. In step S61, an invalidation command from the external power supply button 57 is transmitted to the PC 5. The flow then advances to step S57 to terminate the processing. Upon reception of the invalidation command, the PC 5 grays out the external power supply button as indicated by reference numeral 57 in FIG. 15 by changing the operation window, thereby inactivating the button.

In step S53, the camera cradle apparatus 2 checks the level of an input signal 221 to check the on/off state of the power supply of the DSC 1. If the level of the input signal 221 is LOW level ("Yes" in step S53), it is determined that the power supply of the DSC 1 is off, and the flow advances to step S54. If the level of the input signal 221 is HIGH level ("No" in step S53), it is determined that the power supply of the DSC 1 is on, and the flow advances to step S57.

In step S54, the camera cradle apparatus 2 turns on the power supply of the DSC 1 by setting an output signal 217 at HIGH level for a predetermined period of time.

In step S55, the camera cradle apparatus 2 sets a power supply on flag indicating that the power supply of the DSC 1 is turned on by external operation. The flow then advances to step S56 to terminate the processing. This power supply on flag is equivalent to the flag set in step S5 in FIG. 8 and in step S35 in FIG. 12. Subsequently, the system operates in the "network mode" of responding to access from a device on the LAN, e.g., the PC 5.

In step S57, the power supply on flag is checked. This is the flag which is set in step S55 in FIG. 14, in step S5 in FIG. 8 or in step S35 in FIG. 12. This flag is set when the power supply is turned on with the external power supply button 57, 152, or 211. If it is determined in step S57 that the power supply on flag is set ("Yes" in step S57), the output signal 217 is set at HIGH level for a predetermined period of time in step S58. With this operation, the power supply of the DSC 1 is shut down, and the flow advances to step S56 to terminate the processing. If it is determined in step S57 that the power supply on flag is not set ("No" in step S57), an invalidation command is transmitted from the external power supply button 57 to the PC 5 in step S59 in the same manner as in step S61. Thereafter, a wireless LAN control unit 204 is invalidated in step S60. Alternatively, subsequent data transfer between the DSC 1 and an external network device through the wireless LAN control unit 204 is interrupted. Thereafter, the flow advances to step S56 to terminate the processing. In this case, it can be determined that the power supply is turned on with the power supply button 32 or 153, and the "local mode" is set. In this case, the wireless LAN control unit 204 is invalidated in step S60, and access from any network device is prohibited.

Figure 16:
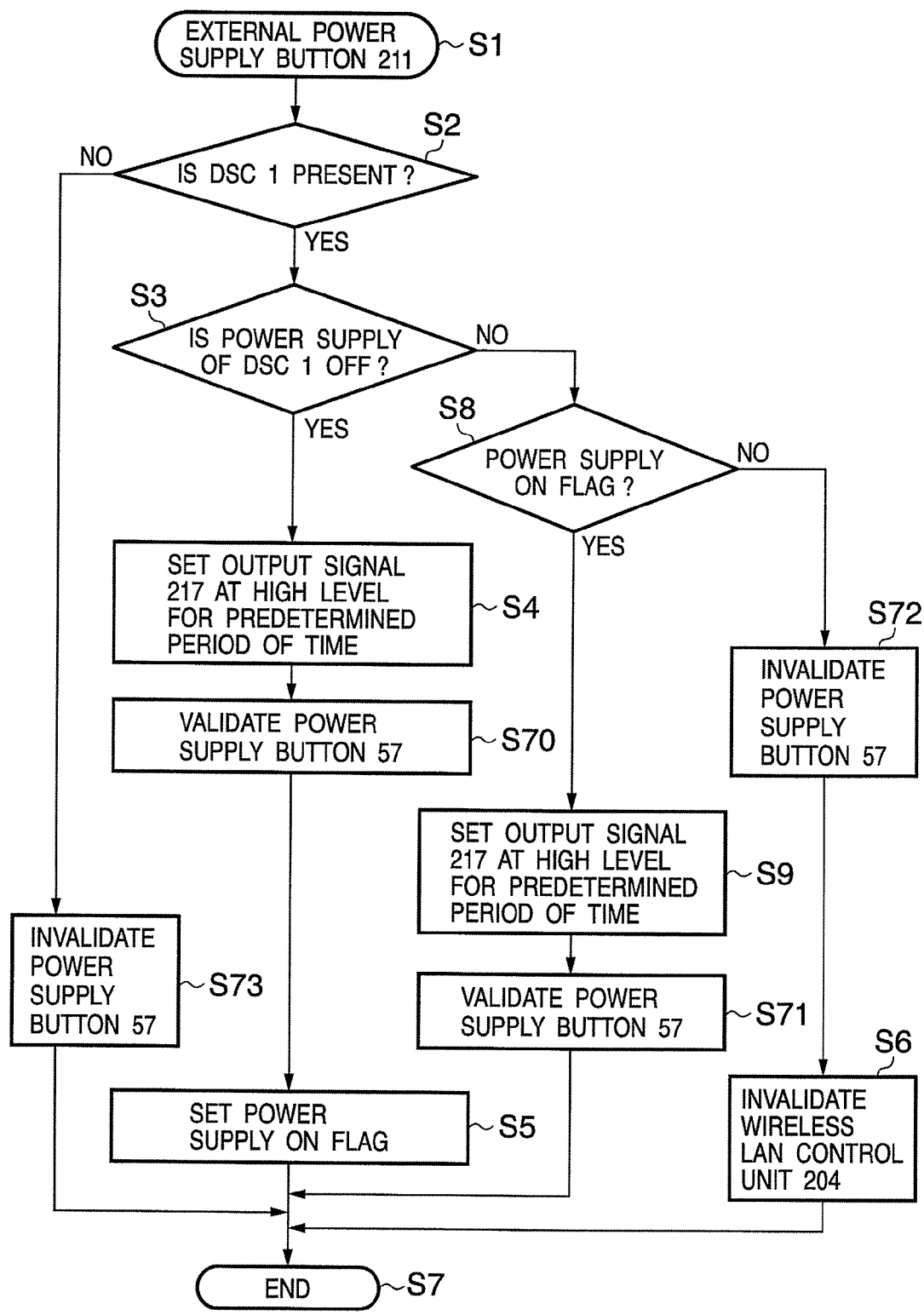
FIG. 16 is a flowchart for explaining the operation of the camera cradle apparatus according to the third preferred embodiment of the present invention.

Like the flowchart of FIG. 8, the flowchart of FIG. 16 starts when the user presses the external power supply button 211 of the camera cradle apparatus 2, and the pressing of the button is detected. This flowchart differs from the flowchart of FIG. 8 in that steps S70, S71, S72, and S73 are added. If it is determined in step S2 in FIG. 16 that the DSC 1 is not mounted ("No" in step S2), an invalidation command from the external power supply button 57 is transmitted to the PC 5 in step S73. The flow then advances to step S7 to terminate the processing. This route corresponds to the state wherein the DSC 1 is not mounted. If it is determined in step S2 that the DSC 1 is mounted ("Yes" in step S2) and it is determined in step S3 that the power supply of the DSC 1 is off ("Yes" in step S3), the following processing is executed. That is, the power supply of the DSC 1 is turned on in step S4, and a validation command from the external power supply button 57 is transmitted to the PC 5 in step S70. Upon reception of the validation command, the PC 5 changes the operation window to display an external power supply button as indicated by reference numeral 57 in FIG. 13 and validate it as a button. In step S5, the PC 5 sets a power supply on flag indicating that the power supply of the camera cradle apparatus 2 is turned on. The flow then advances to step S7 to terminate the processing. This route corresponds to operation in the "network mode". Assume that it is determined in step S2 that the DSC 1 is mounted ("Yes" in step S2), it is determined in step S3 that the power supply is on ("No" in step S3), and it is determined in step S8 that the power supply on flag is set ("Yes" in step S8). In this case, the following processing is performed. After the power supply of the DSC 1 is shut down in step S9, a validation command from the external power supply button 57 is transmitted to the PC 5 in step S71. The processing is then terminated. This route corresponds to a state wherein the power supply is off. Assume that it is determined in step S2 that the DSC 1 is mounted ("Yes" in step S2), it is determined in step S3 that the power supply is on ("No" in step S3), and it is determined in step S8 that the power supply on flag is not set ("No" in step S8). In this case, the following processing is performed. That is, as in step S73, in step S72, an invalidation command from the external power supply button 57 is transmitted to the PC 5. In step S6, the wireless LAN control unit 204 is invalidated or subsequent data transfer from the wireless LAN control unit 204 to the DSC 1 is interrupted. The flow then advances to step S7 to terminate the processing. This route corresponds to operation in the "local mode".

Figure 17:
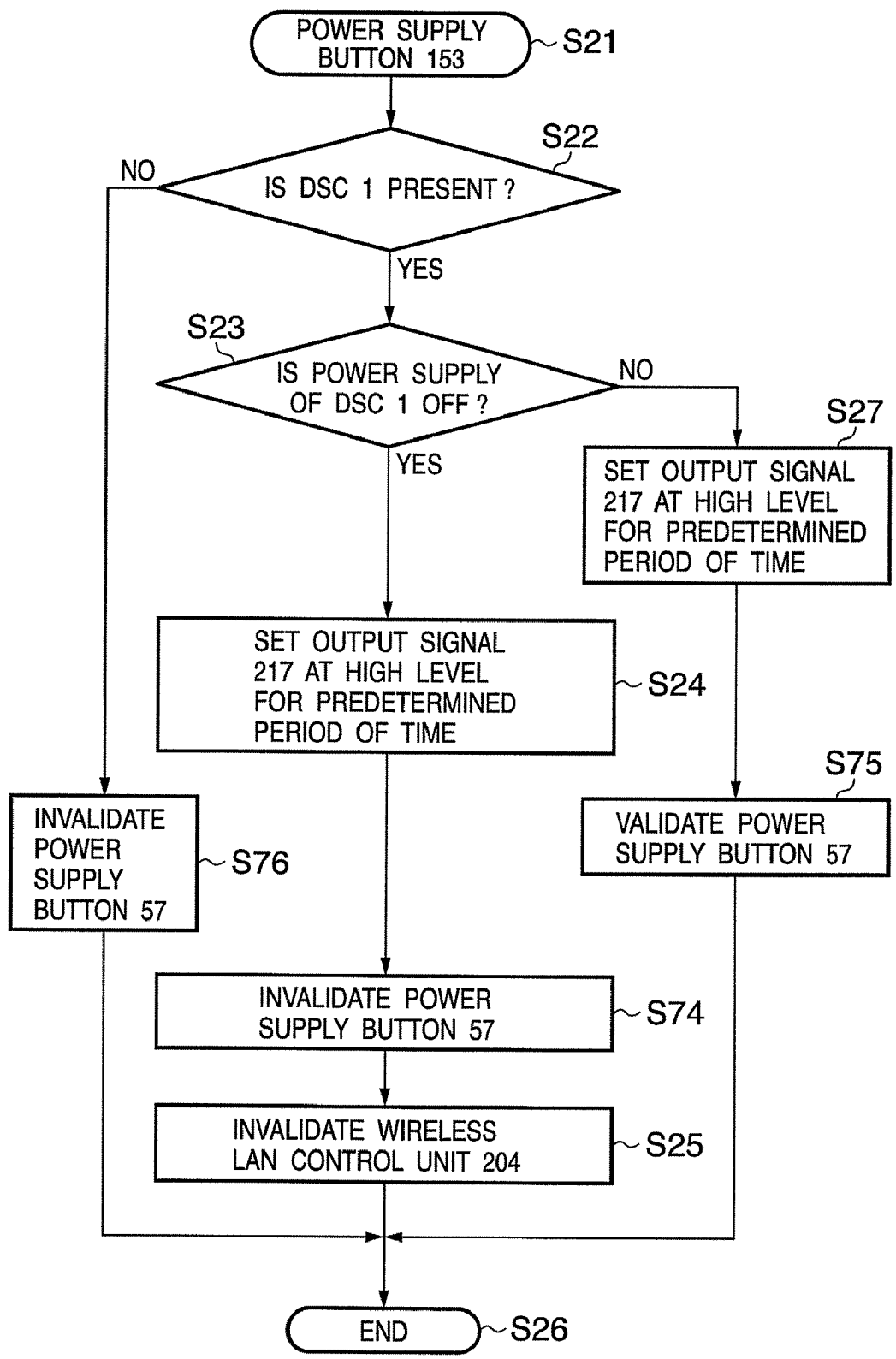
FIG. 17 is a flowchart for explaining the operation of the camera cradle apparatus according to the third preferred embodiment of the present invention.
Figure 22:
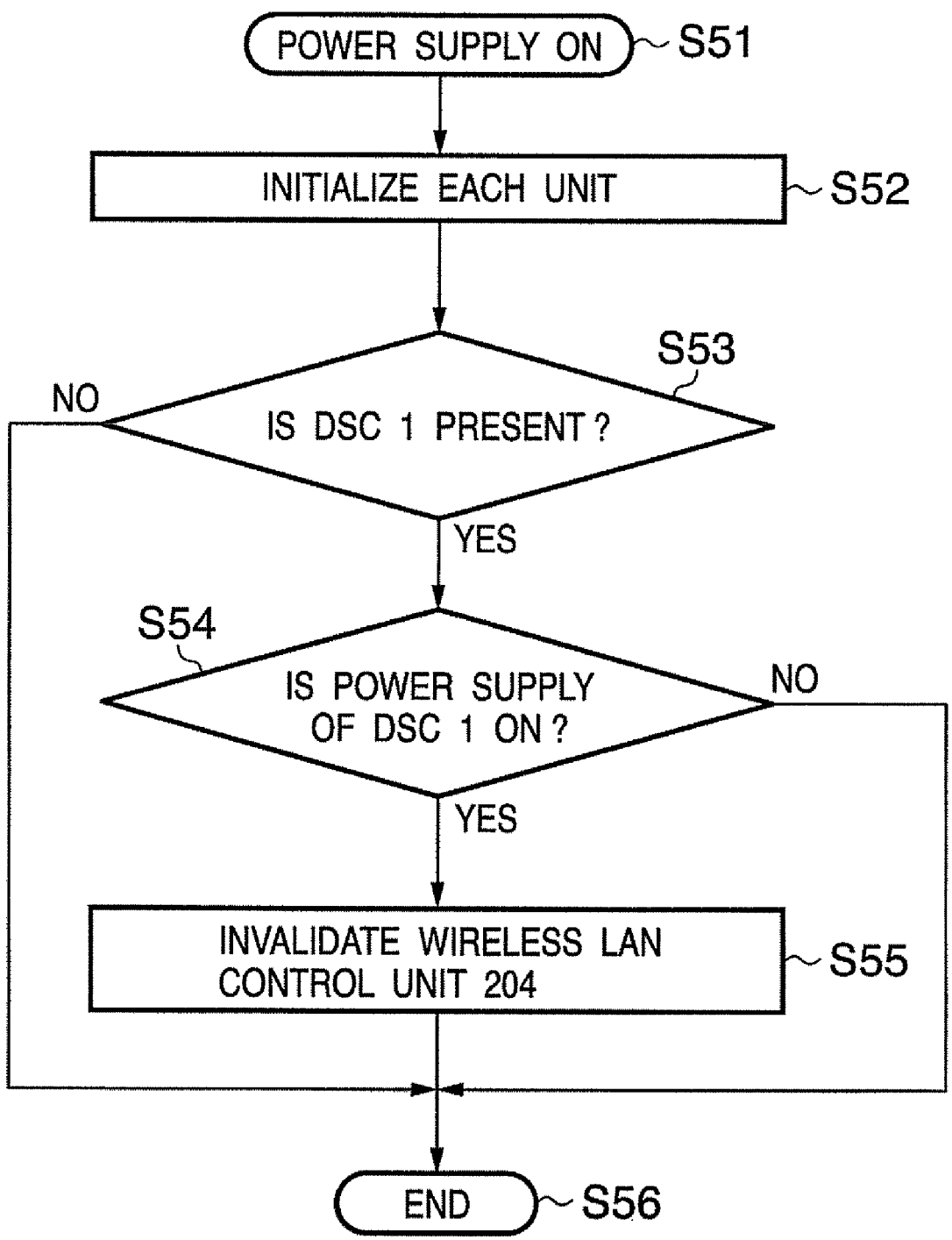
FIG. 22 is a flowchart for explaining the operation of a camera cradle apparatus according to the fifth preferred embodiment of the present invention.

Like the flowchart of FIG. 11, the flowchart of FIG. 17 starts when the user presses the local mode external power supply button 153 of a remote controller 10, and the pressing of the button is detected. This flowchart differs from the flowchart of FIG. 11 in that steps S74, S75, and S76 are added. If it is determined in step S22 in FIG. 17 that the DSC 1 is not mounted ("No" in step S22), an invalidation command from the external power supply button 57 is transmitted to the PC 5 in step S76. The flow then advances to step S26 to terminate the processing. This route corresponds to a case wherein the DSC 1 is not mounted. If it is determined in step S22 that the DSC 1 is mounted ("Yes" in FIG. 22) and it is determined in step S23 that the power supply of the DSC 1 is on ("No" in step S23), the following processing is performed. After the power supply of the DSC 1 is shut down in step S27, a validation command from the external power supply button 57 is transmitted to the PC 5 in step S75. The processing is then terminated. This route corresponds to a case wherein the power supply is off. If it is determined in step S22 that the DSC 1 is mounted ("Yes" in step S22) and it is determined in step S23 that the power supply is off ("Yes" in step S23), the following processing is performed. That is, in step S24, the power supply of the DSC 1 is turned on. In step S74, an invalidation command from the external power supply button 57 is transmitted to the PC 5. In step S25, the wireless LAN control unit 204 is invalidated or subsequent data transfer from the wireless LAN control unit 204 to the DSC 1 is interrupted. The flow then advances to step S26 to terminate the processing. This route corresponds to operation in the "local mode".

Figure 18:
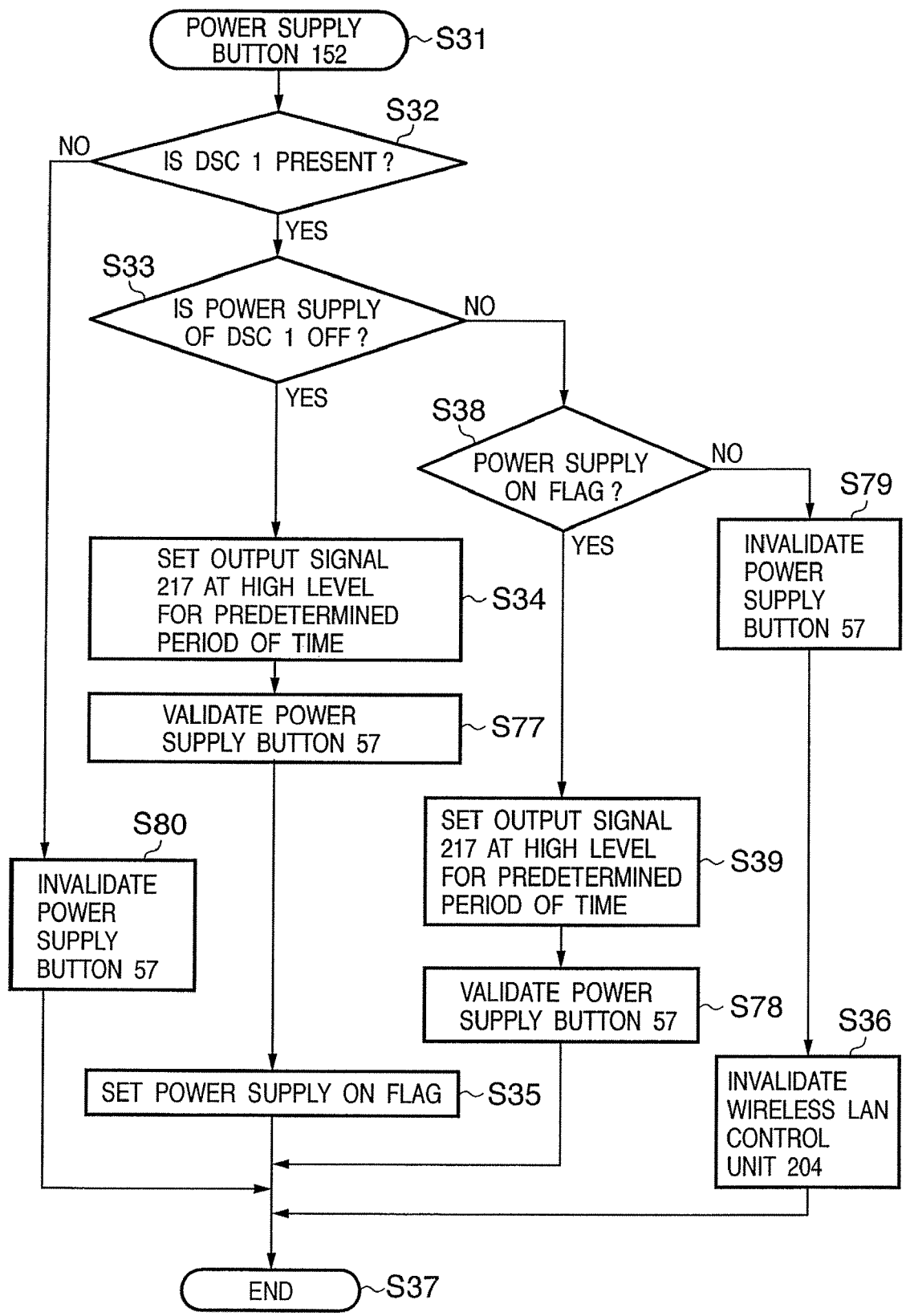
FIG. 18 is a flowchart for explaining the operation of the camera cradle apparatus according to the third preferred embodiment of the present invention.

Like the flowchart of FIG. 12, the flowchart of FIG. 18 starts when the user presses the network mode external power supply button 152 of the remote controller 10, and the pressing of the button is detected. This flowchart differs from the flowchart of FIG. 12 in that steps S77, S78, S79, and S80 are added. If it is determined in step S32 in FIG. 18 that the DSC 1 is not mounted ("No" in step S32), an invalidation command from the external power supply button 57 is transmitted to the PC 5 in step S80. The flow then advances to step S37 to terminate the processing. This route corresponds to a state wherein the DSC 1 is not mounted. If it is determined in step S32 that the DSC 1 is mounted ("Yes" in step S33) and it is determined in step S33 that the power supply of the DSC 1 is off ("Yes" in FIG. 33), the following processing is performed. In step S34, the power supply of the DSC 1 is turned on. In step S77, a validation command from the external power supply button 57 is transmitted to the PC 5. In step S35, the power supply on flag indicating that the power supply of the DSC 1 is turned on by external operation is set in step S35. The flow then advances to step S37 to terminate the processing. This power supply on flag is equivalent to the flag set in step S5 in FIG. 16. This route corresponds to operation in the "network mode". Assume that it is determined in step S32 that the DSC 1 is mounted ("Yes" in step S32), it is determined in step S33 that the power supply is on ("No" in step S33), and it is determined in step S38 that the power supply on flag is set ("Yes" in step S38). In this case, the following processing is performed. After the power supply of the DSC 1 is shut down in step S39, a validation command from the external power supply button 57 is transmitted to the PC 5 in step S78. The processing is then terminated. This route corresponds to a state wherein the power supply is off. Assume that it is determined in step S32 that the DSC 1 is mounted ("Yes" in step S32), it is determined in step S33 that the power supply is on ("No" in step S33), and it is determined in step S38 that the power supply on flag indicating that the power supply of the DSC 1 is turned on by external operation is not set ("No" in step S38). In this case, the following processing is performed. As in step S80, in step S79, an invalidation command from the external power supply button 57 is transmitted to the PC 5. In step S36, the wireless LAN control unit 204 is invalidated, or subsequent data transfer from the wireless LAN control unit 204 to the DSC 1 is interrupted. The flow then advances to step S37 to terminate the processing. This route corresponds to operation in the "local mode".

As described above, when the power supply button of the DSC or the local mode external power supply button of the remote controller is pressed, the system operates in the local mode in which access from the network is prohibited. When the external power supply button of the camera cradle apparatus, the network mode external power supply button of the remote controller, or the external power supply button of the external terminal is pressed, the system operates in the "network mode" in which access from the network is permitted. This makes it possible to realize a system which allows a user to explicitly designate an operation mode by intuitive operation.

In addition, the power supply cannot be shut down during local mode operation by the operation of the camera cradle apparatus or the operation of the network mode external power supply button of the remote controller or the external terminal. This can realize a system which prevents the power supply from being accidentally shut down during local mode operation.

Furthermore, if the external power supply button of the external terminal cannot be used, the display of the external power supply button is changed to allow the user to discriminate that the button cannot be operated on the screen, and the button operation is invalidated. This makes it possible to realize a system which can explicitly indicate to the user that operation can/cannot be performed, and prevent operation errors.

Fourth Embodiment

The above embodiments have been described on the assumption that the DSC is mounted on the camera cradle apparatus while the power supply of the DSC is off. In contrast, in the fourth embodiment, a DSC is mounted on a camera cradle apparatus while the power supply of the DSC is on. In the above embodiments, whether the DSC 1 is mounted is discriminated by reading out the input signal 222. In contrast, in this embodiment, when a DSC is mounted on the camera cradle apparatus, an interrupt is generated to determine the power supply state of the DSC 1.

The following description will be centered on additional and different portions with respect to the above embodiments.

Figure 19:
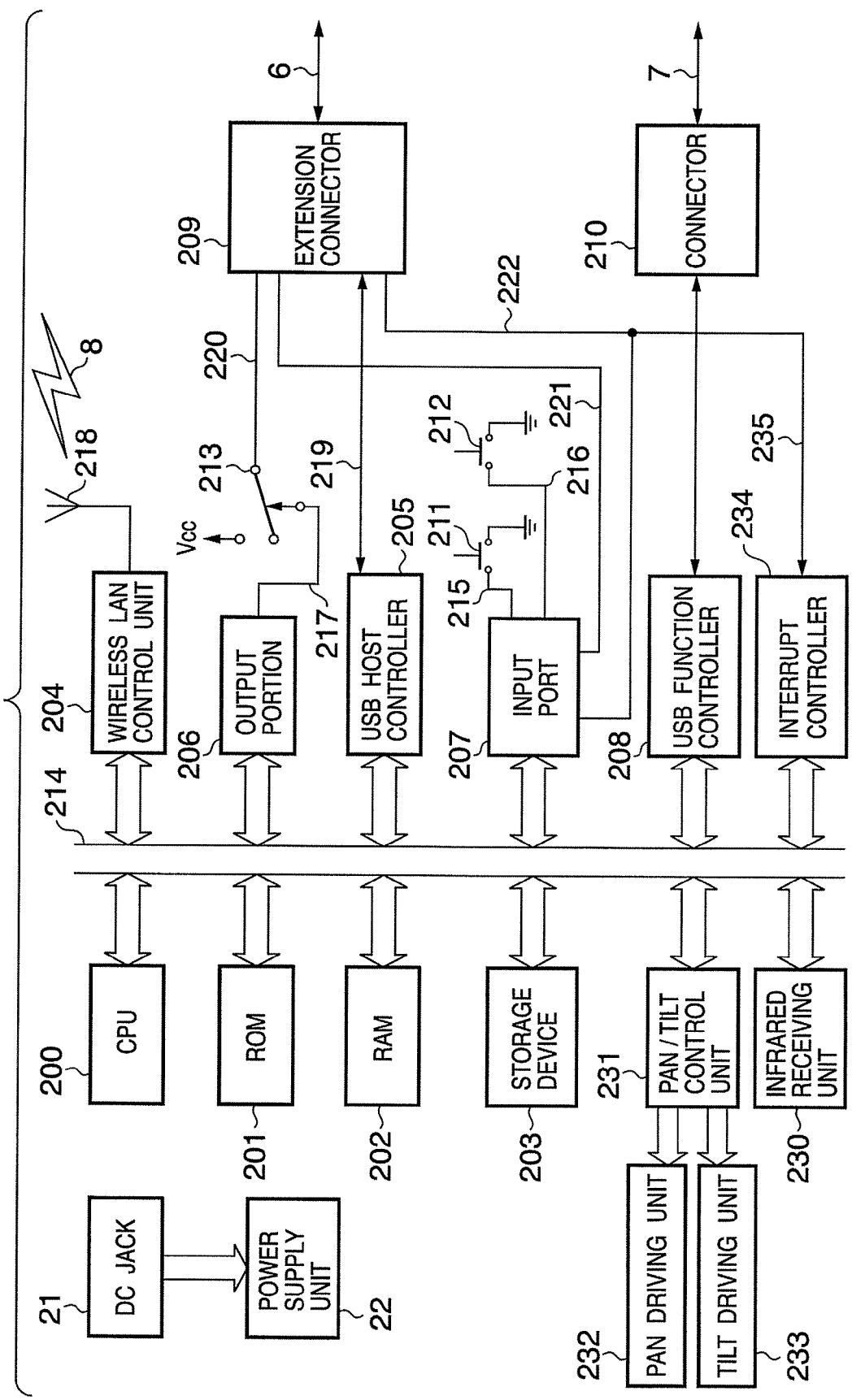
FIG. 19 is a block diagram showing the arrangement of a camera cradle apparatus according to the fourth preferred embodiment of the present invention.

FIG. 19 is a schematic block diagram of a camera cradle apparatus 2. The arrangement in FIG. 19 differs from that shown in FIG. 7 described in the first embodiment in that an interrupt controller 234 connected to a system bus 214 is added. An input signal 222 is connected to an interrupt terminal 235.

Figure 20:
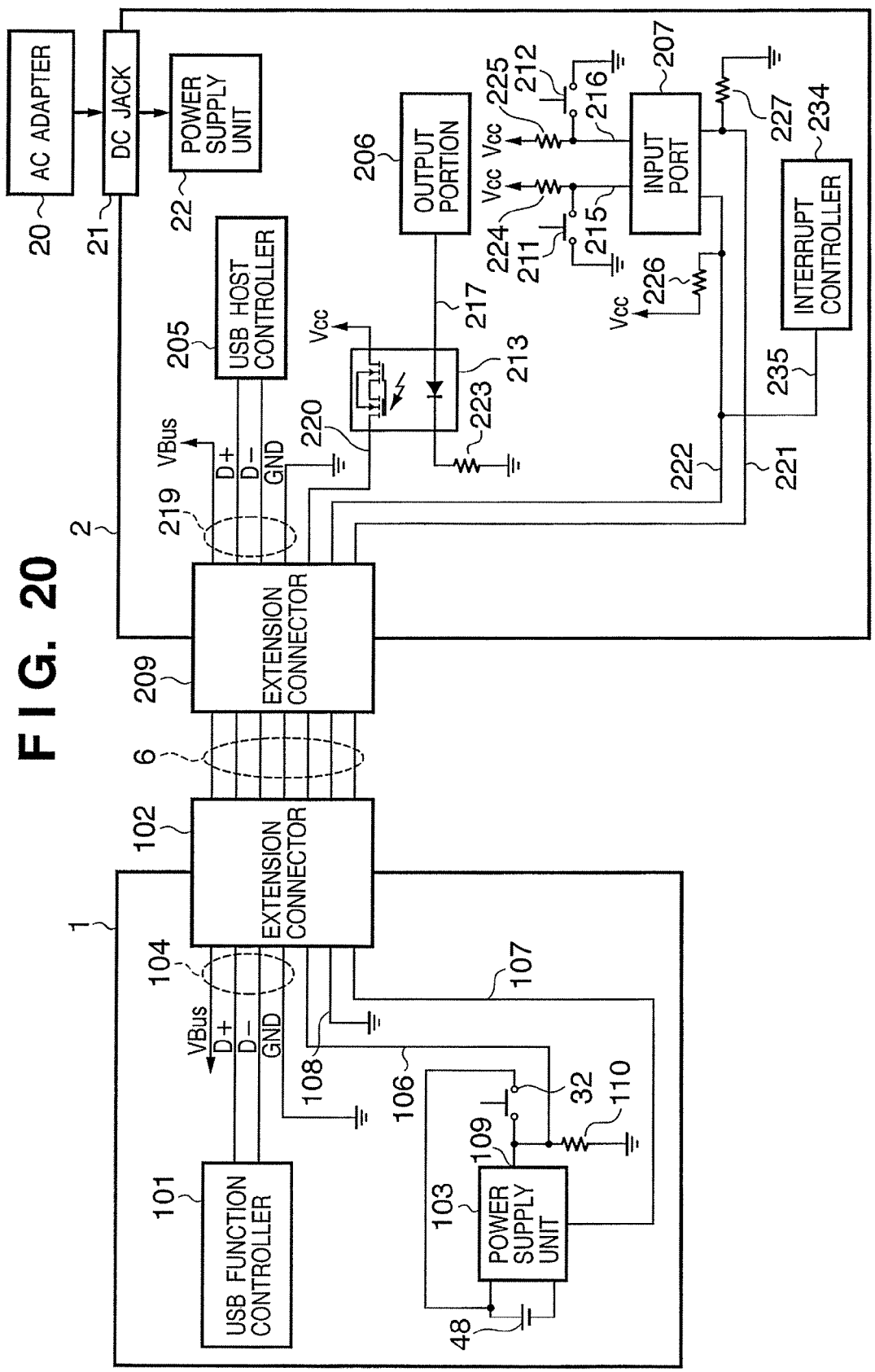
FIG. 20 is a block diagram showing the detailed arrangement of the camera cradle apparatus according to the fourth preferred embodiment of the present invention.

FIG. 20 is a block diagram of the DSC 1 and camera cradle apparatus 2, and shows the connector between them for the sake of explanation. Like the arrangement shown in FIG. 19, the arrangement shown in FIG. 20 differs from that shown in FIG. 1 described in the first embodiment in that the interrupt controller 234 and the interrupt terminal 235 to which the input signal 222 is connected are added. The interrupt controller 234 generates an interrupt to a CPU 200 at the trailing edge of the interrupt terminal 235. When the DSC 1 is not mounted, the input signal 222 is pulled up by a resistor 226 to be set at HIGH level. When the DSC 1 is mounted, the input signal 222 is connected to a signal line 108 connected to GND to be set at LOW level. That is, a trailing edge is input to the interrupt terminal 235, to which the input signal 222 is connected, to generate an interrupt to the CPU 200.

Figure 21:
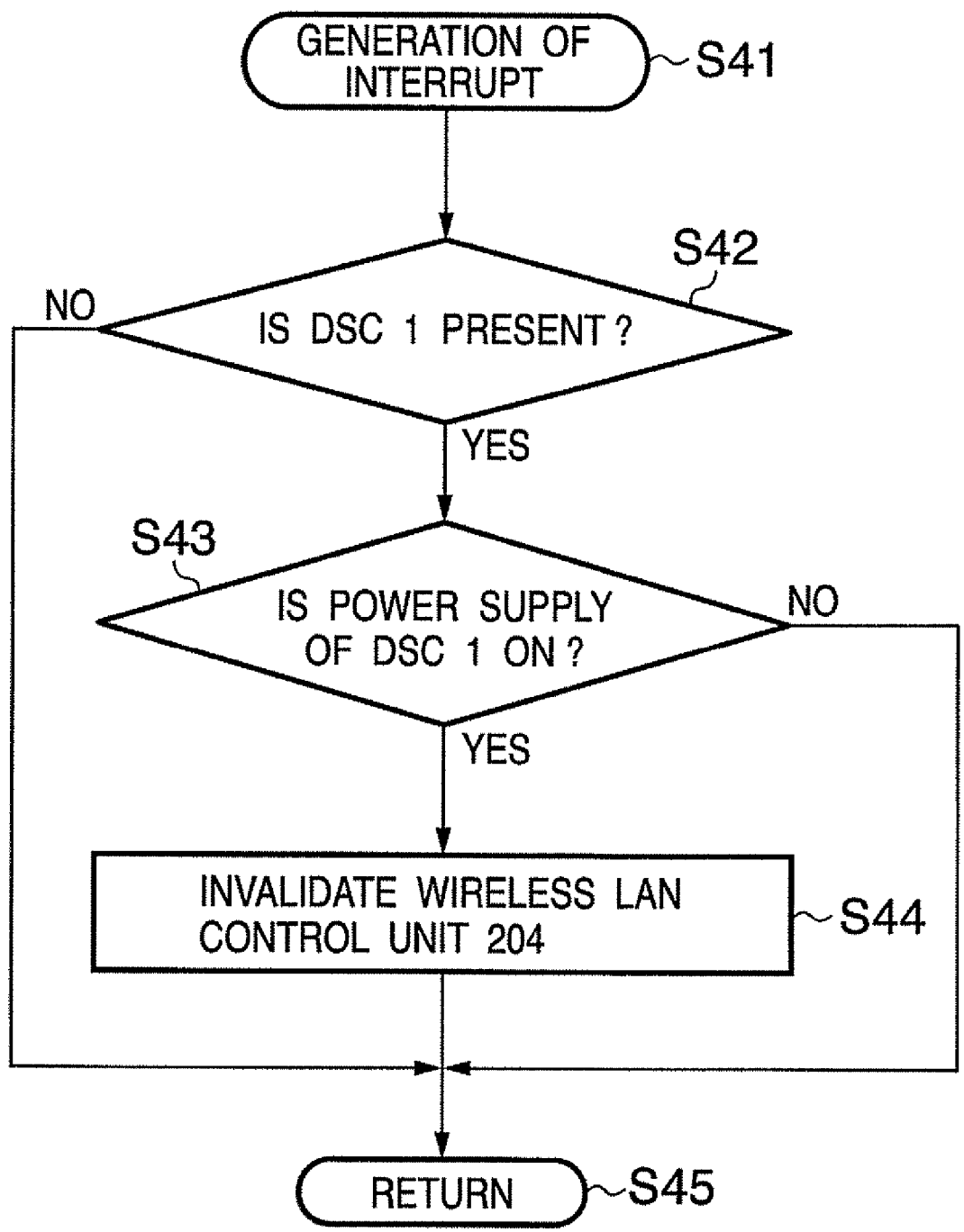
FIG. 21 is a flowchart for explaining the operation of the camera cradle apparatus according to the fourth preferred embodiment of the present invention.

The operation of the camera cradle apparatus 2 with the above arrangement will be described with reference to FIG. 21. FIG. 21 shows interrupt processing which starts when the DSC 1 is mounted on the camera cradle apparatus 2, and an interrupt is generated to the CPU 200.

In step S41, an interrupt is generated to the CPU 200.

In step S42, the camera cradle apparatus 2 checks the level of the input signal 222 to check the presence/absence of the DSC 1. Since an interrupt has been generated because the DSC 1 is mounted, the flow should advance to step S43 upon determination that the DSC 1 is present. If, however, it is determined that the DSC is absent, it indicates that an invalid interrupt is generated due to some cause. In step S45, the interrupt processing is terminated.

In step S43, the camera cradle apparatus 2 checks the level of an input signal 221 to check the on/off state of the power supply of the DSC 1. If the level of the input signal 221 is LOW level, it is determined that the power supply of the DSC 1 is off. In step S45, the interrupt processing is terminated. Subsequently, as described in the above embodiments, the flow waits for the detection of the pressing of various kinds of power supply switches of the DSC 1, camera cradle apparatus 2, remote controller 10, and PC 5. If it is determined in step S43 that the input signal 221 is at HIGH level, the power supply of the DSC 1 is on. In step S44, a wireless LAN control unit 204 is then invalidated. Alternatively, subsequent data transfer from the wireless LAN control unit 204 to the DSC 1 is interrupted, and the interrupt processing in step S45 is terminated. The route of step S41→step S42→step S43→step S44→step S45 corresponds to operation in the "local mode". As described in the first embodiment, for example, image copying can be performed from the DSC 1 to the camera cradle apparatus by subsequent operation of a direct transfer button 47 of the DSC 1, a copy button 212 of the camera cradle apparatus 2, or the like. This is a typical application in the local mode.

As described above, when the DSC is mounted on the camera cradle apparatus while the power supply of the DSC is on, the system operates in the local mode. This makes it possible to realize a system which can execute a series of operations, e.g., performing photography by singly using the DSC, mounting the DSC on the camera cradle apparatus, and performing image copying from the DSC to the camera cradle apparatus, with minimum operation.

Fifth Embodiment

The above embodiments have been described on the assumption that the power supply of the camera cradle apparatus 2 is always on. Operation to be performed when the power supply of a camera cradle apparatus 2 is turned on will be described with reference to FIG. 22. The flowchart of FIG. 22 starts when an AC adapter 20 is connected to a DC jack 21 of the camera cradle apparatus 2, and the power supply of the camera cradle apparatus 2 is turned on, and mainly shows a portion associated with this embodiment.

In step S51, the power supply of the camera cradle apparatus 2 is turned on.

In step S52, the camera cradle apparatus 2 performs initialization for the internal register of a CPU 200, a wireless LAN control unit 204, an output portion 206, a USB host controller 205, a USB function controller 208, and the like.

In step S53, the camera cradle apparatus 2 checks the level of an input signal 222 to check the presence/absence of a DSC 1. If the input signal 222 is at HIGH level and it is determined that the DSC is absent ("No" in step S53), the initialization processing at the time of power supply ON is terminated in step S56. If the input signal 222 is at LOW level and it is determined that the DSC is present ("Yes" in step S53), the flow advances to step S54.

In step S54, the camera cradle apparatus 2 checks the level of an input signal 221. If the level of the input signal 221 is LOW level, the power supply of the DSC 1 is off ("No" in step S54). In step S56, the initialization processing at the time of power supply ON is terminated. If the input signal 221 is at HIGH level, the power supply of the DSC 1 is on ("Yes" in step S54). Subsequently, in step S55, the wireless LAN control unit 204 is invalidated. Alternatively, subsequent data transfer from the wireless LAN control unit 204 to the DSC 1 is interrupted, and the initialization processing at the time of power supply ON is terminated in step S56. This route of step S51→Step S52→step S53→step S54→step S55→step S56 corresponds to operation in the "local mode". As described above, image copying can be performed from the DSC 1 to the camera cradle apparatus by subsequent operation of a direct transfer button 47 of the DSC 1, a copy button 212 of the camera cradle apparatus 2, or the like. This is a typical application in the local mode. In this manner, when the power supply of the camera cradle apparatus is turned on after the DSC is mounted on the camera cradle apparatus while the power supply of the DSC is on, the system can be made to operate in the "local mode".

As described above, when the DSC is mounted on the camera cradle apparatus while the power supply of the DSC is on, the system operates in the local mode. This makes it possible to implement a system which can execute a series of operations, e.g., performing photography by the DSC alone, mounting the DSC on the camera cradle apparatus, and performing image copying from the DSC to the camera cradle apparatus, with a little operations.

In addition, even when the power supply of the camera cradle apparatus is turned on after the power supply of the DSC is mounted on the camera cradle apparatus while the power supply of the DSC is on, the system operates in the local mode. This makes it possible to implement a system which can execute the local mode with minimum operation even when the DSC is mounted on the camera cradle apparatus while the user forgets to turn on the power supply of the camera cradle apparatus.

Other Embodiment

The above embodiments have exemplified the case wherein the camera cradle apparatus and the access point are connected to each other through the wireless LAN, and the access point and the external terminal are connected to each other through a wired LAN. However, the preferred embodiments of the present invention are not limited to these I/Fs. For example, the camera cradle apparatus and the personal computer may be connected by a wireless ad-hoc mode or wired direct coupling without through the access point.

According to the above embodiment, priority is given to the local mode external power supply button such that the power supply cannot be shut down during local mode operation by the network mode external power supply button, and the power supply can be shut down by the local mode external power supply button in any mode. On the contrary, however, priority may be given to the network mode external power supply button. Alternatively, the power supply may be shut down by either of the two buttons in any mode or may be shut down in only either of the modes.

In the above embodiment, the remote controller comprises two types of power supply buttons, i.e., the local mode external power supply button and the network mode external power supply button. However, the functions may be switched by using one of the power supply buttons or comprising one power supply button.

In the above embodiment, communication between the remote controller and the camera cradle apparatus is implemented by one-way data communication using infrared light. However, this communication may be implemented by wireless or wired communication or two-way communication.

According to the fourth embodiment, when the camera is mounted on the camera cradle apparatus, an interrupt is generated. If an interrupt is generated upon detection of the power supply "on" of the camera, an interrupt is generated only when the camera is present and the power supply is on. Therefore, the above two states can be detected at once.

The above embodiment has exemplified the case wherein the camera and the camera cradle apparatus are connected to each other by wired connection using the connector. However, they may be connected by wireless connection. First of all, as a USB used for data transfer, a wireless unit such as a wireless USB 802.11, 801.11b, 802.11g, or 801.11a, or BLUETOOTH can be used. As a method of turning on the power supply of the camera from the camera cradle apparatus, there can be provided a method of providing an electric field, magnetic field, light, or the like from the camera cradle apparatus, preparing a receiving unit which receives it on the camera side, and turning on the power supply of the camera by using the output. Furthermore, both the detection of the camera and the detection of the power supply state of the camera can be determined depending on whether the above wireless data transfer unit is active.

As has been described above, according to the preferred embodiments of the present invention, the user can intuitively select an operation mode to be activated depending on the type of power supply button to be operated, and hence need not be conscious of a power supply ON sequence. In addition, setting the priority mode makes it possible to prevent operation errors. In addition, a camera cradle system can be realized, which comprises a camera, a camera cradle apparatus, an external terminal, and the like which can change the display of the external power supply button of the external terminal and the permission/prohibition of the use thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-225552, filed Aug. 3, 2005, which is hereby incorporated by reference herein in its entirety.

What is claimed is:

1. A camera cradle apparatus comprising:
   a first connector which connects a camera including a power supply button;
   a second connector which connects an external terminal through a network so as to allow communication; and
   a control unit which controls a connection state of said second connector, wherein the camera cradle apparatus includes an external power supply button which performs on-off operation of a power supply of the camera, and
   said control unit interrupts data communication through the second connector when the power supply of the camera is turned on by the power supply button, and permits data communication through the second connector when the power supply of the camera is turned on by the external power supply button.

2. The apparatus according to claim 1, wherein said control unit prohibits off operation of the power supply of the camera by the external power supply button when interrupting data communication through the second connector, and permits off operation of the power supply of the camera by the external power supply button when permitting data communication through the second connector.

3. The apparatus according to claim 1, further comprising a receiver which receives a signal from a remote controller so as to allow communication, wherein
   the remote controller includes at least one of a first external power supply button and a second external power supply button which performs on-off operation of the power supply of the camera, and
   said control unit interrupts data communication through said second connector when the power supply of the camera is turned on by the first external power supply button, and permits data communication through said second connector when the power supply of the camera is turned on by the second external power supply button.

4. The apparatus according to claim 3, wherein said control unit prohibits off operation of the power supply of the camera by the second external power supply button when interrupting data communication through the second connector, and permits off operation of the power supply of the camera by the second external power supply button when permitting data communication through the second connector.

5. The apparatus according to claim 1, wherein the external terminal displays an external power supply button thereof on a display unit, and changes a display method for the external power supply button displayed on the display unit or invalidates a function of the external power supply button displayed on the display unit when said control unit permits data communication through the second connector.

6. The apparatus according to claim 1, wherein said control unit interrupts data communication through said second connector when the camera is connected to said first connector while the power supply of the camera is on.

7. The apparatus according to claim 6, further comprising a power supply unit which turns on a power supply of the camera cradle apparatus,
wherein said control unit interrupts data communication through the second connector when the power supply of the camera cradle apparatus is turned on by said power supply unit if the camera is connected to said first connector while the power supply of the camera is on.

8. The apparatus according to claim 3, wherein the remote controller can communicate with said receiver by using infrared light.

9. The apparatus according to claim 1, wherein said second connector includes a wireless communication means.

10. A cradle system comprising:
a camera cradle apparatus defined in claim 1; and
a camera connected to said first connector.

11. A connection control method for a camera cradle apparatus, comprising steps of:
connecting a camera to a camera cradle apparatus;
connecting an external terminal to the camera cradle apparatus through a network so as to allow communication; and
controlling a connection state between the external terminal and the camera cradle apparatus in accordance with whether the power supply of the camera is turned on by either of a power supply button of the camera, and an external power supply button which performs on-off operation of a power supply of the camera, placed on the camera cradle apparatus
wherein, in the controlling step, data communication between the external terminal and the camera cradle apparatus is interrupted when the power supply of the camera is turned on by the power supply button, and data communication between the external terminal and the camera cradle apparatus is permitted when the power supply of the camera is turned on by the external power supply button.

* * * * *